(12) United States Patent
Muramatsu et al.

(10) Patent No.: US 7,800,999 B2
(45) Date of Patent: Sep. 21, 2010

(54) INFORMATION RECORDING MEDIUM, INFORMATION RECORDING DEVICE AND METHOD, AND COMPUTER PROGRAM

(75) Inventors: Eiji Muramatsu, Saitama (JP); Kunihiko Horikawa, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 1122 days.

(21) Appl. No.: 10/577,227

(22) PCT Filed: Jun. 30, 2005

(86) PCT No.: PCT/JP2005/012048

§ 371 (c)(1),
(2), (4) Date: Jun. 26, 2006

(87) PCT Pub. No.: WO2006/003979

PCT Pub. Date: Jan. 12, 2006

(65) Prior Publication Data

US 2009/0016183 A1    Jan. 15, 2009

(51) Int. Cl.
*G11B 7/12* (2006.01)

(52) U.S. Cl. ............... 369/47.53; 369/53.22; 369/53.24

(58) Field of Classification Search ... 369/47.49–47.55, 369/53.11–53.14, 53.22, 53.26–53.27, 59.11–59.14, 369/59.25–59.26, 94, 124.07–124.08, 275.1–275.4; 428/64.2–65.9; 430/270.11–270.21
See application file for complete search history.

(56) References Cited

U.S. PATENT DOCUMENTS 5,706,271 A * 1/1998 Hashimoto ............... 369/53.37

2003/0185121 A1* 10/2003 Narumi et al. ........... 369/47.53
2004/0264317 A1* 12/2004 Lee .......................... 369/47.5
2004/0264339 A1* 12/2004 Miyagawa et al. ........... 369/94

FOREIGN PATENT DOCUMENTS

| EP | 1 191 524 A1 | 3/2002 |
|---|---|---|
| EP | 1 195 749 A2 | 4/2002 |
| EP | 1 318 509 A1 | 6/2003 |
| EP | 1 631 956 A0 | 3/2006 |
| EP | 1 639 586 A0 | 3/2006 |
| JP | 2000-311346 | 11/2000 |
| JP | 2001-23237 | 1/2001 |
| JP | 2003-288759 | 10/2003 |
| JP | 2004-171740 | 6/2004 |
| JP | 2004-295940 | 10/2004 |

* cited by examiner

*Primary Examiner*—Wayne R Young
*Assistant Examiner*—Nathan A Danielsen
(74) *Attorney, Agent, or Firm*—Young & Thompson

(57) ABSTRACT

An information recording medium (100) is provided with: a first recording layer (L0 layer) having a first calibration area (103-1) in which test information for calibrating a power of laser light in recording record information can be recorded; and a second recording layer (L1 layer) having a second calibration area (103-2) in which the test information can be recorded and in which at least one portion of a recording area faces the first calibration area, wherein the first calibration area and the second calibration area including a space area (103U-1, 103U-2) having a predetermined size in positions facing each other, the test information is recorded in a recording area (103R-1) located on one side, centered on the space area, in the first calibration area, and the test information is recorded in a recording area (103R-2) located on other side which is opposite to the one side, centered on the space area, in the second calibration area.

5 Claims, 12 Drawing Sheets

[FIG. 1]
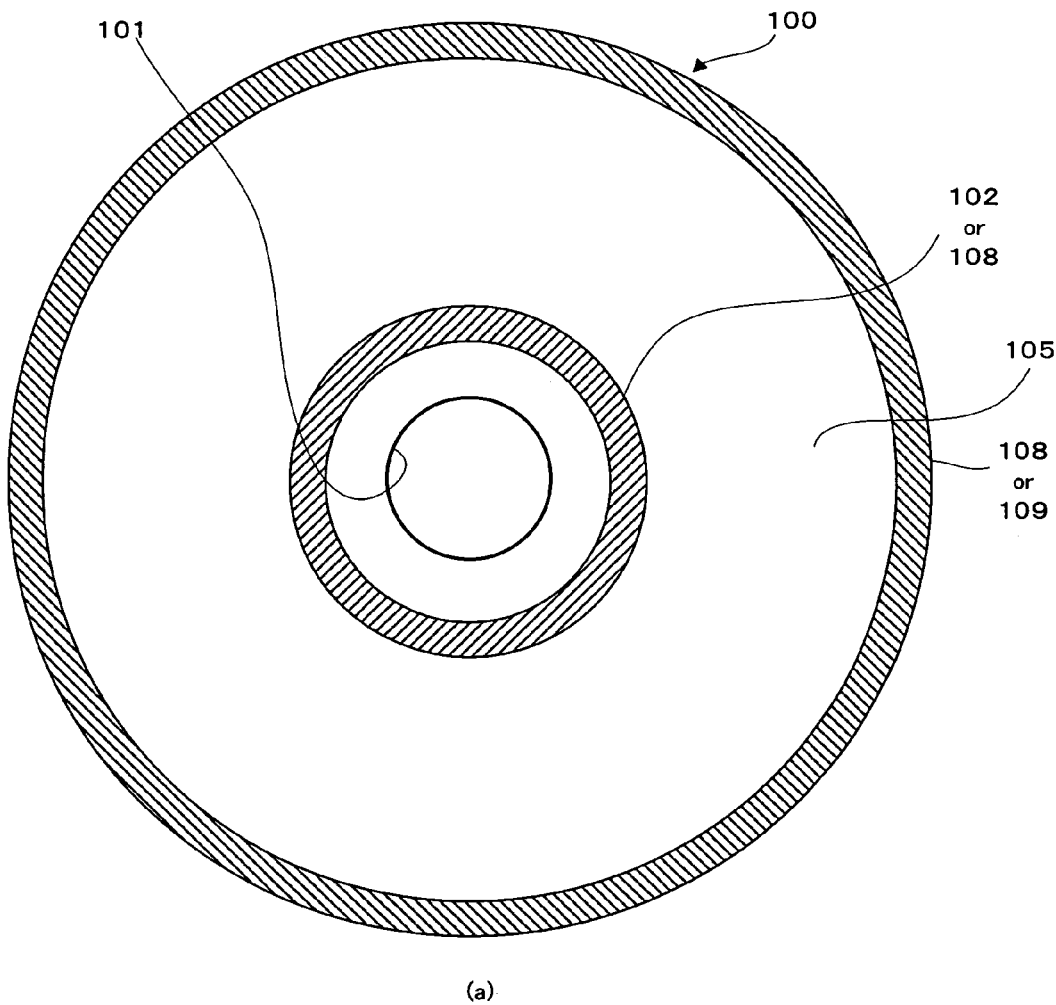
(a)
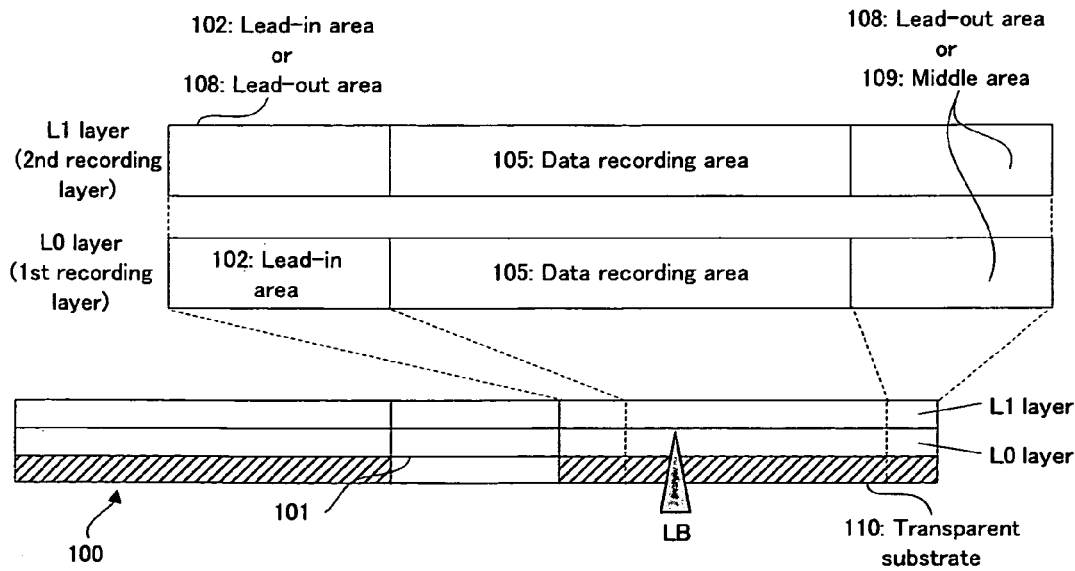
(b)

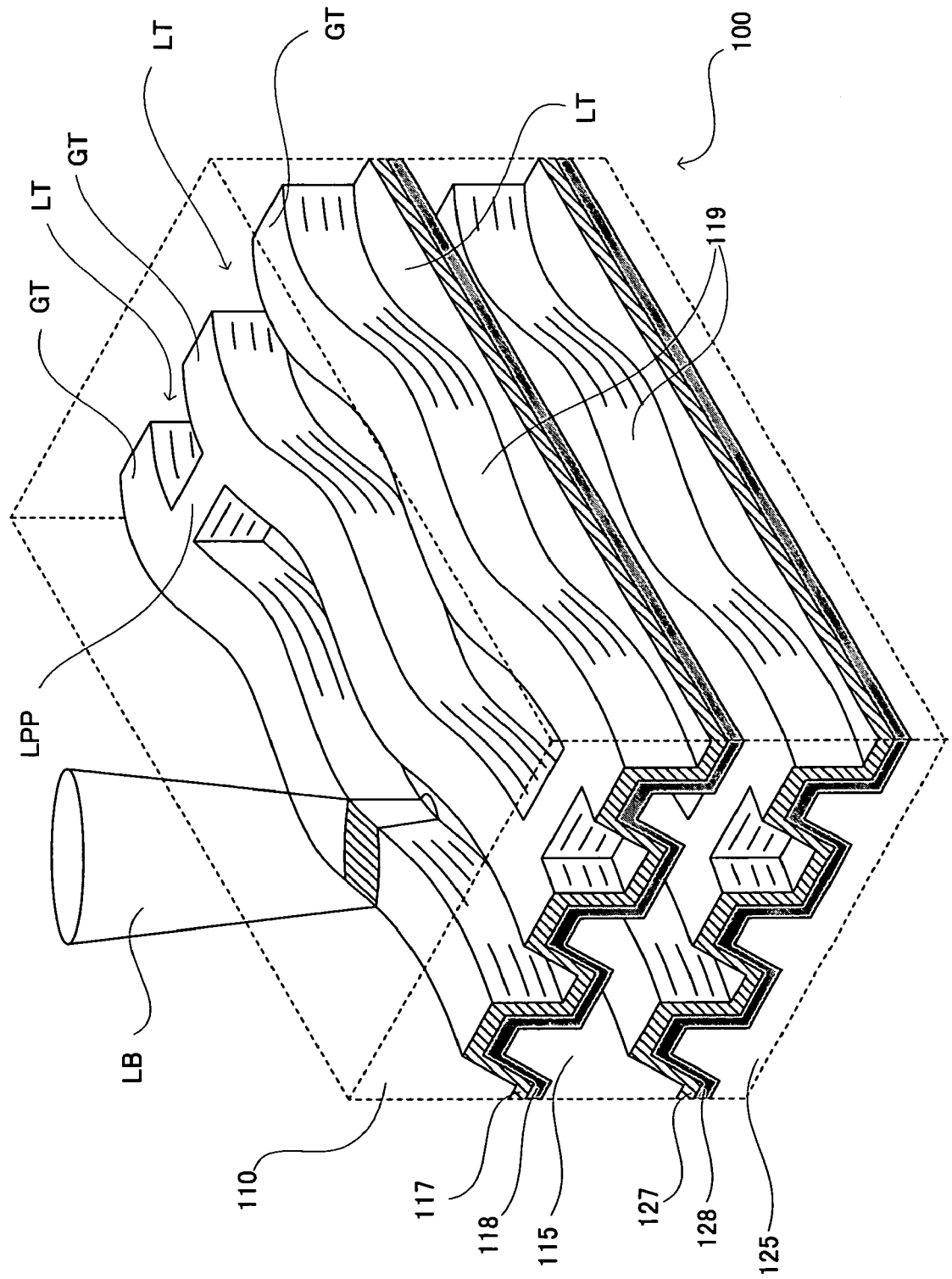
[FIG. 2]

[FIG. 3]
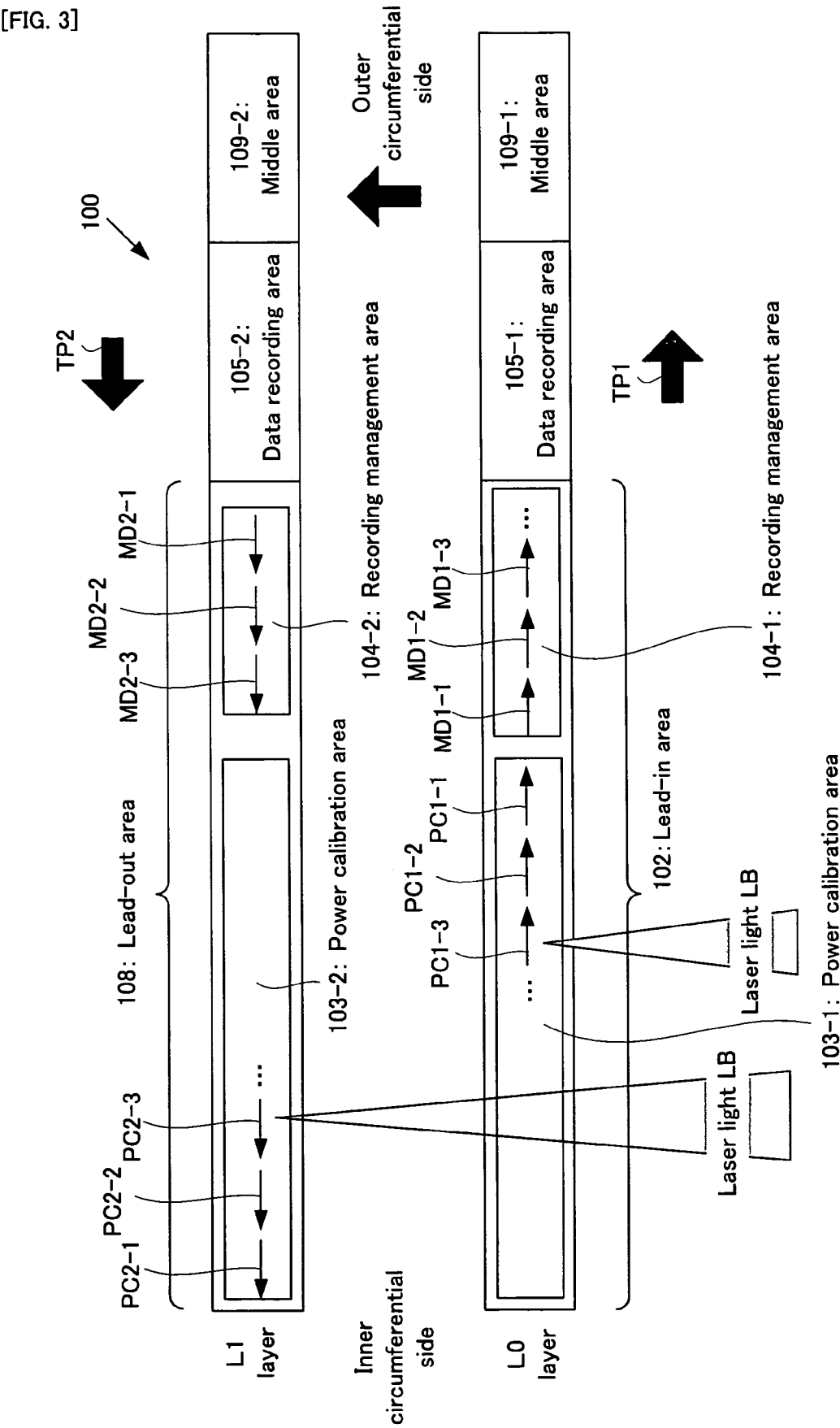

[FIG. 4]
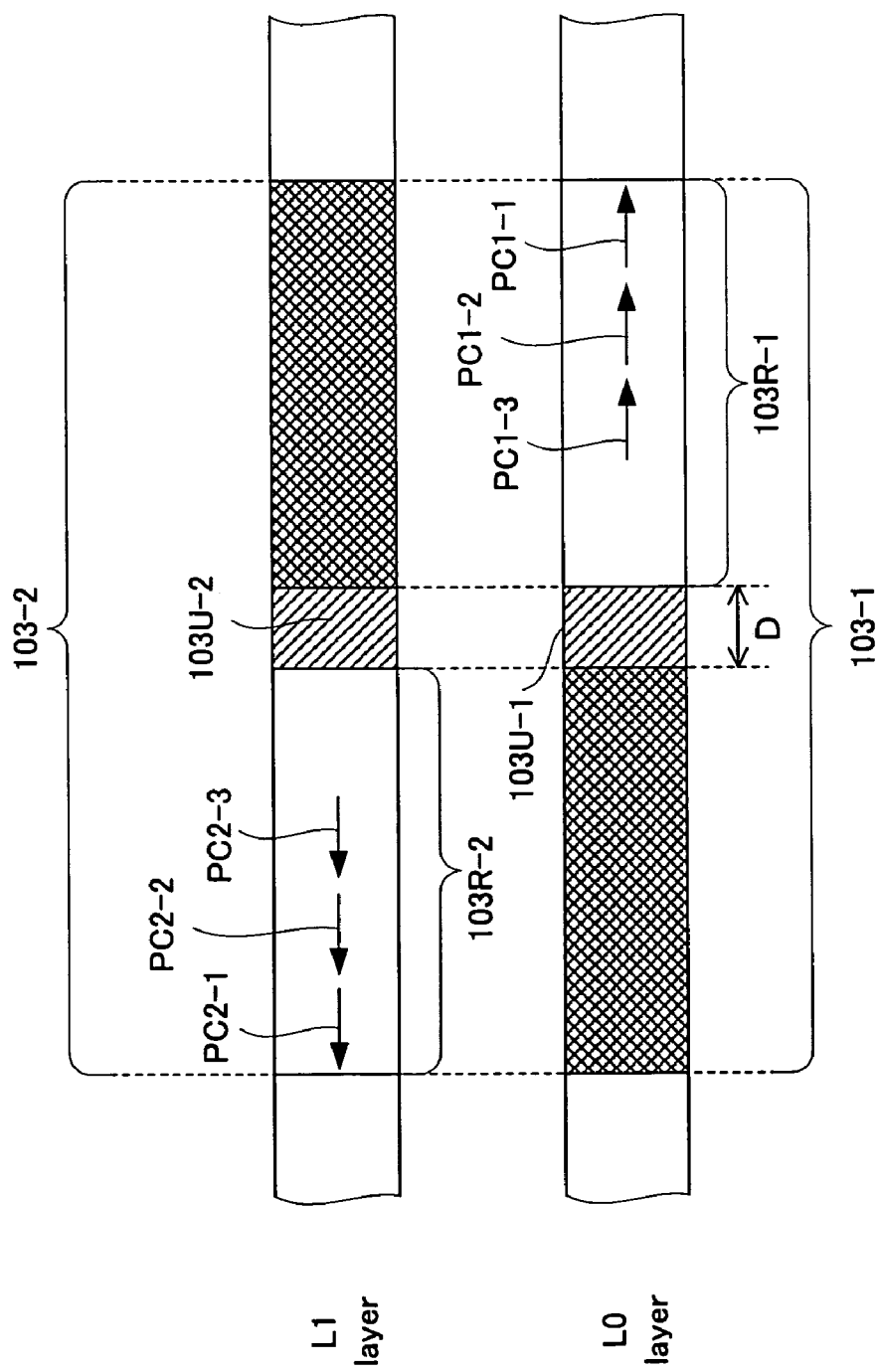

[FIG. 5]
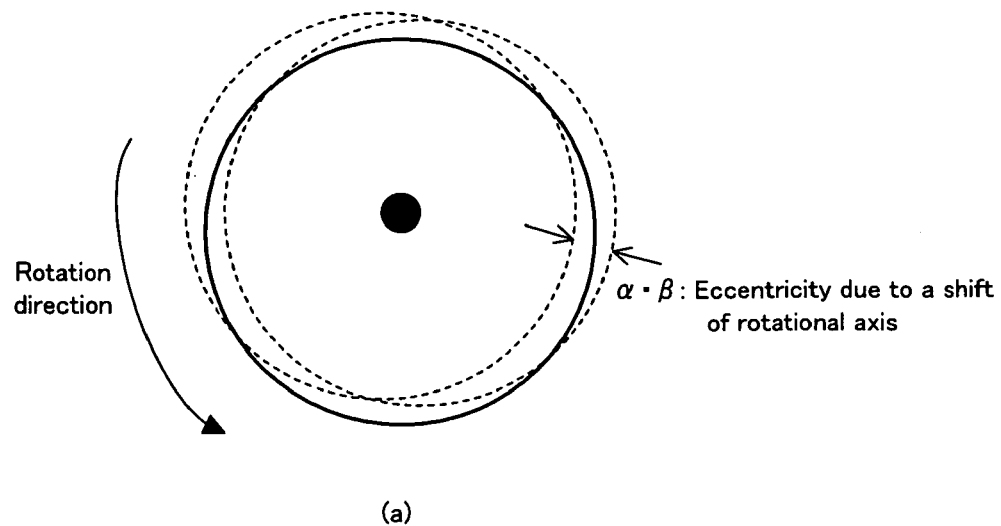
(a)
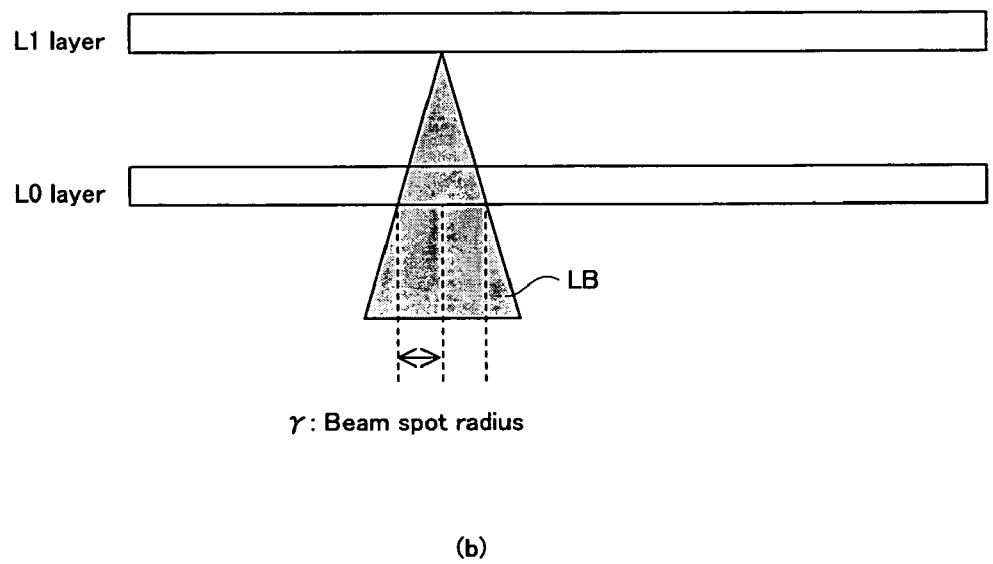
(b)

[FIG. 6]
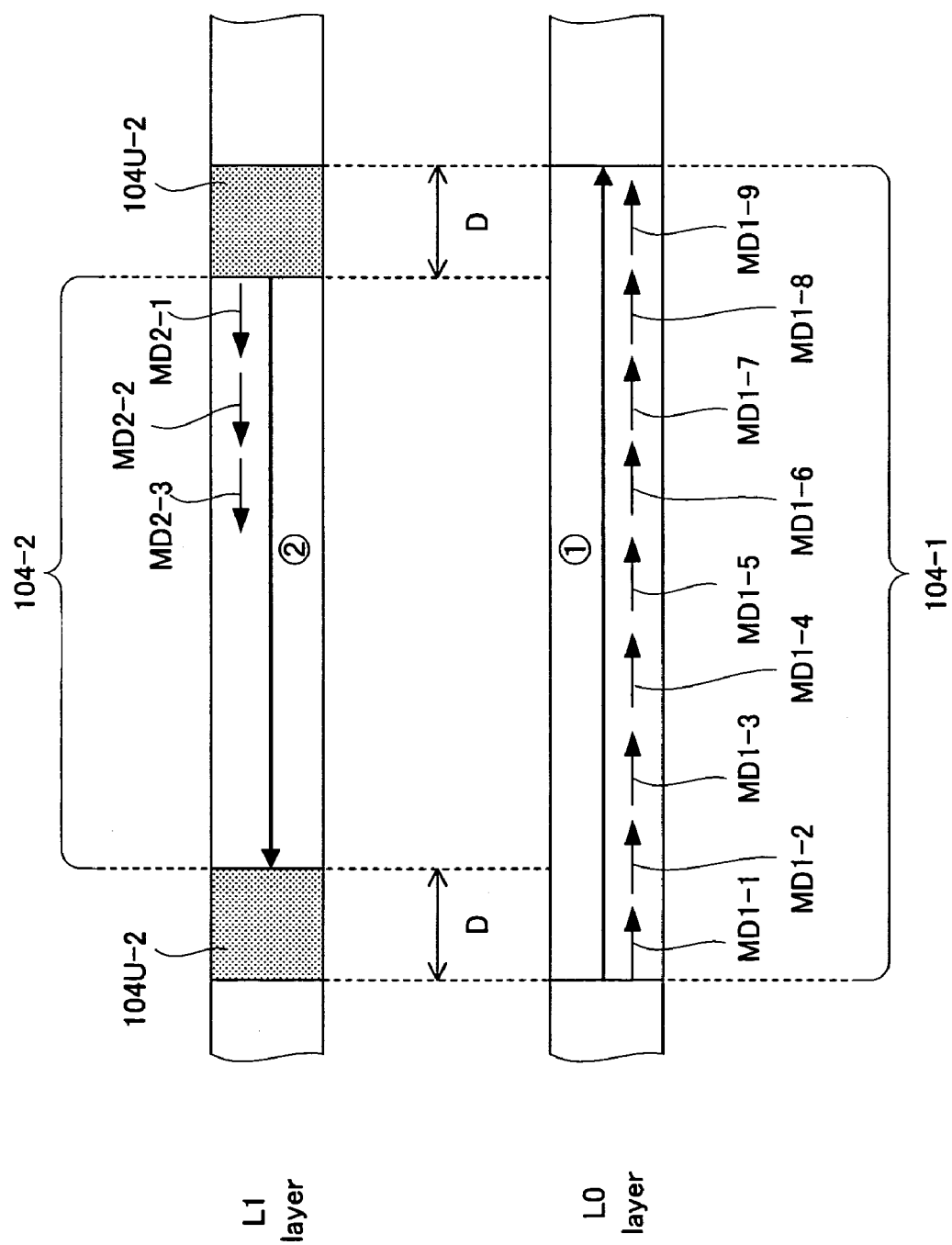

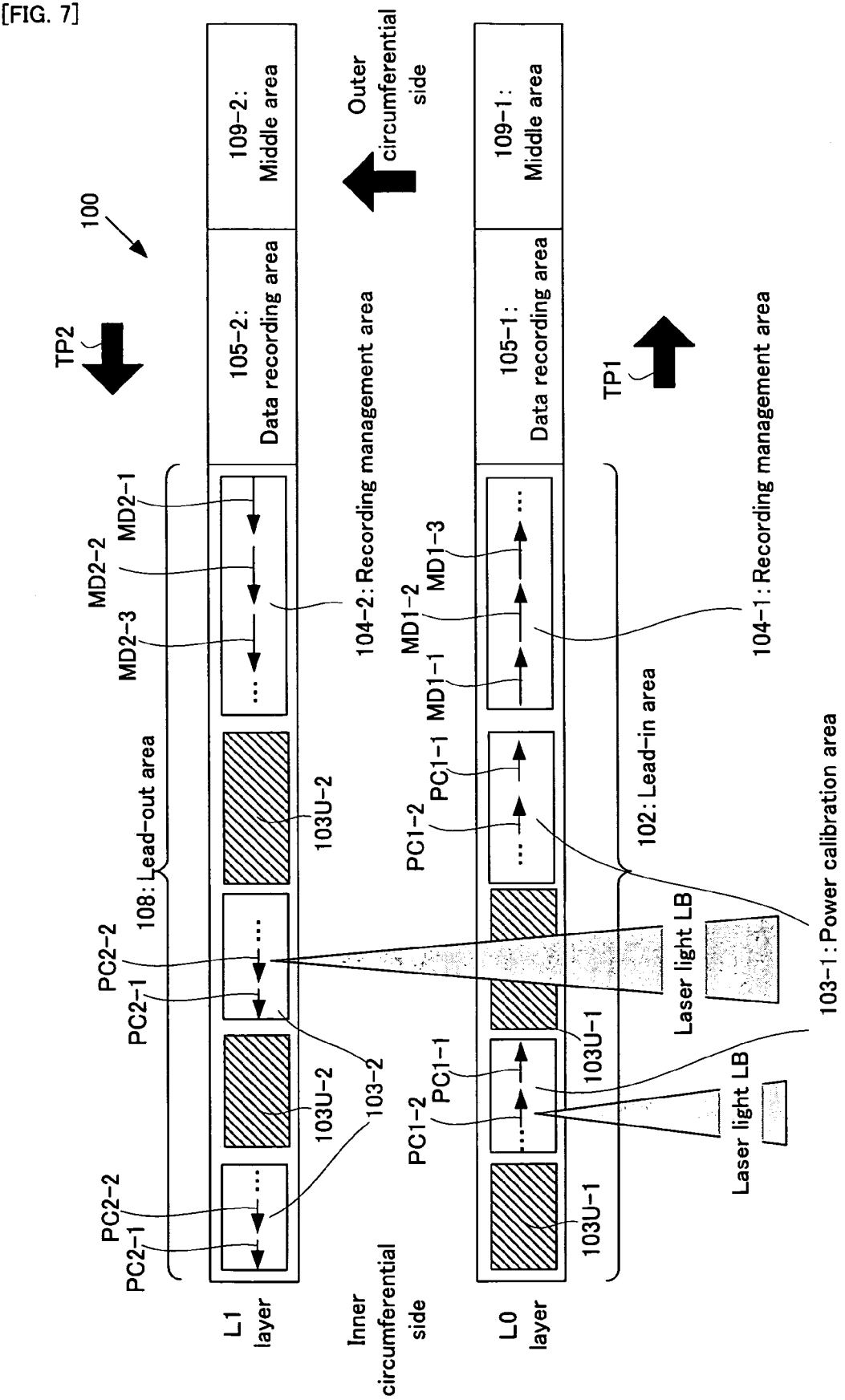
[FIG. 7]

[FIG. 8]
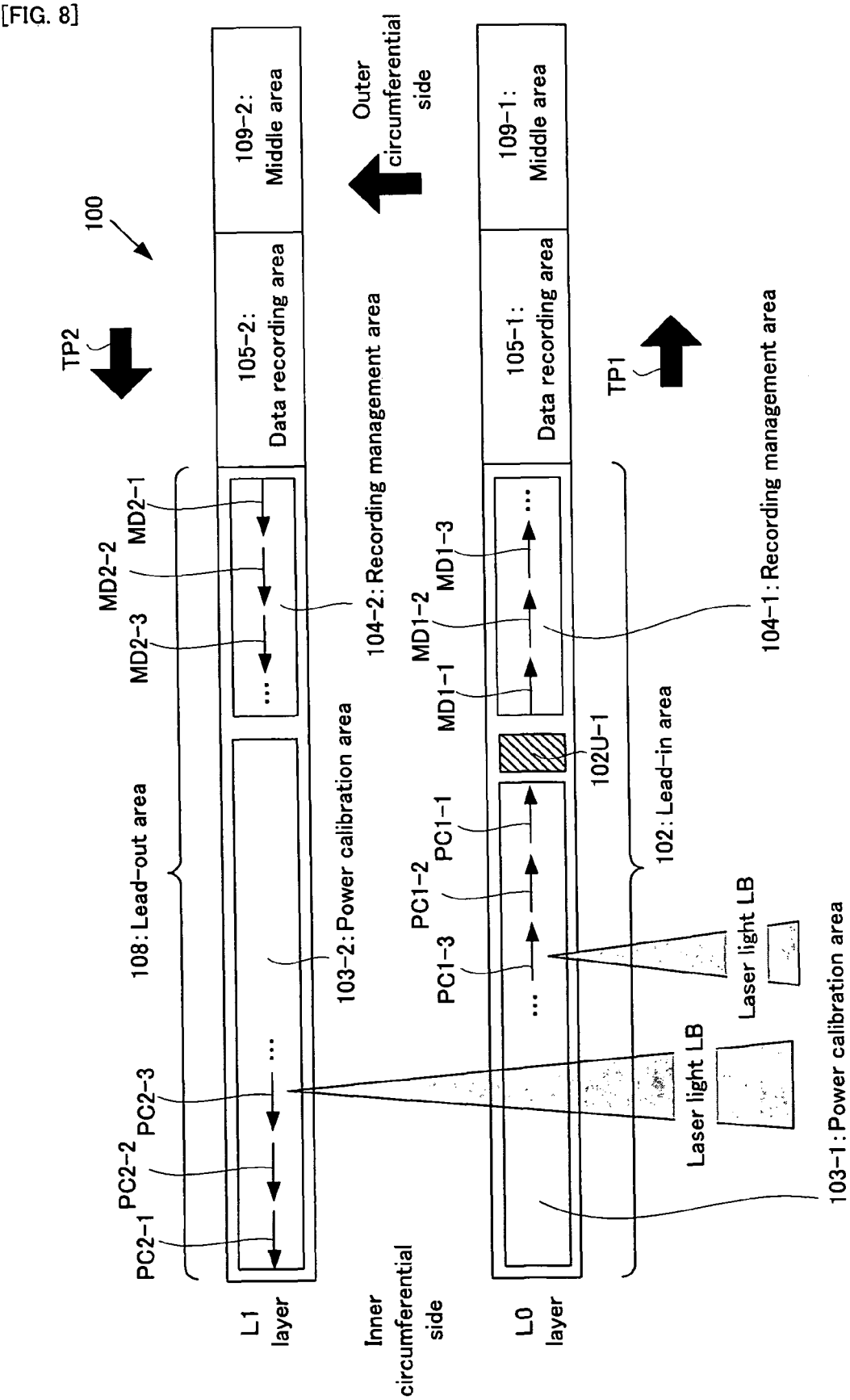

[FIG. 9]
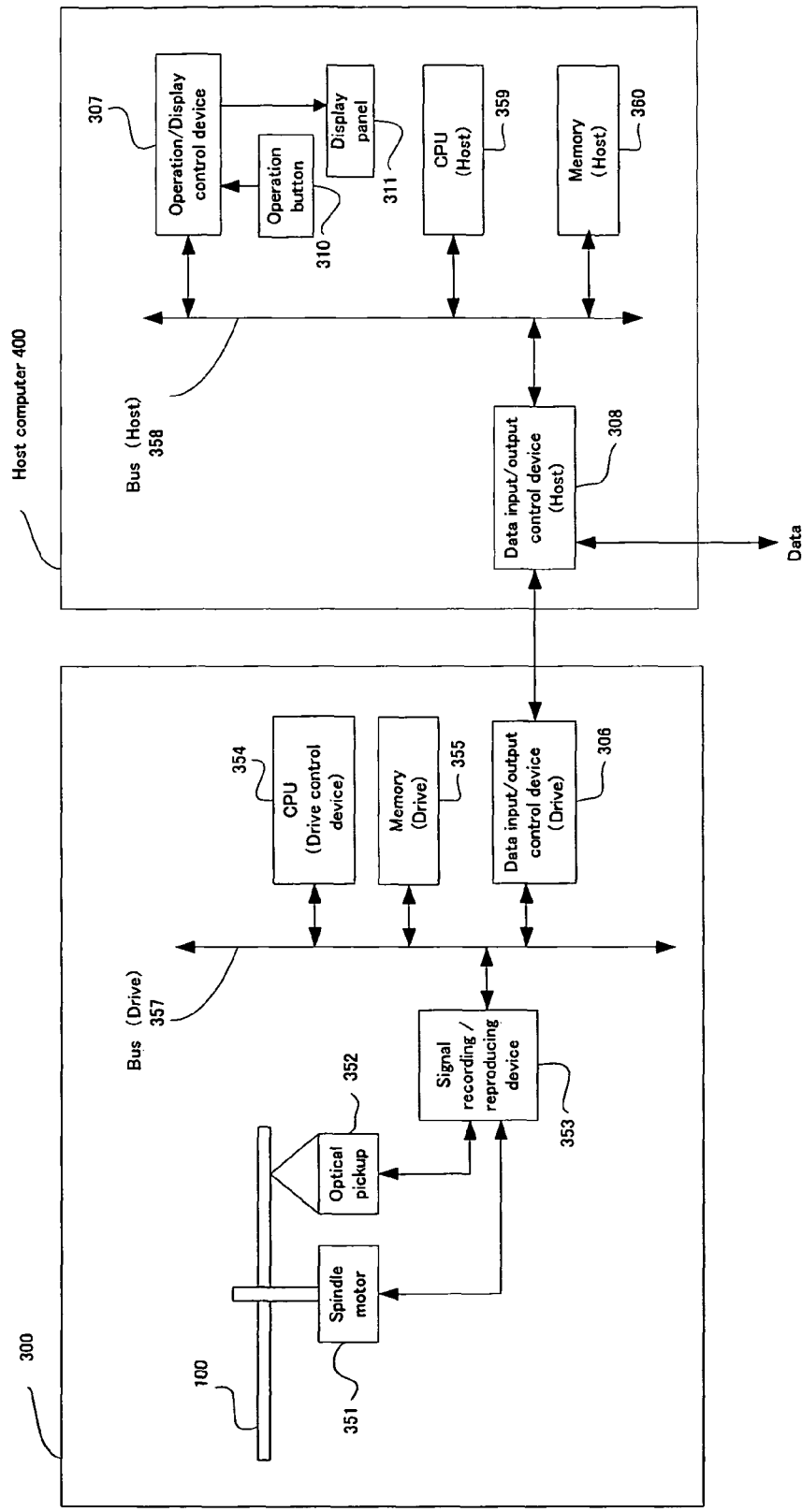

[FIG. 10]
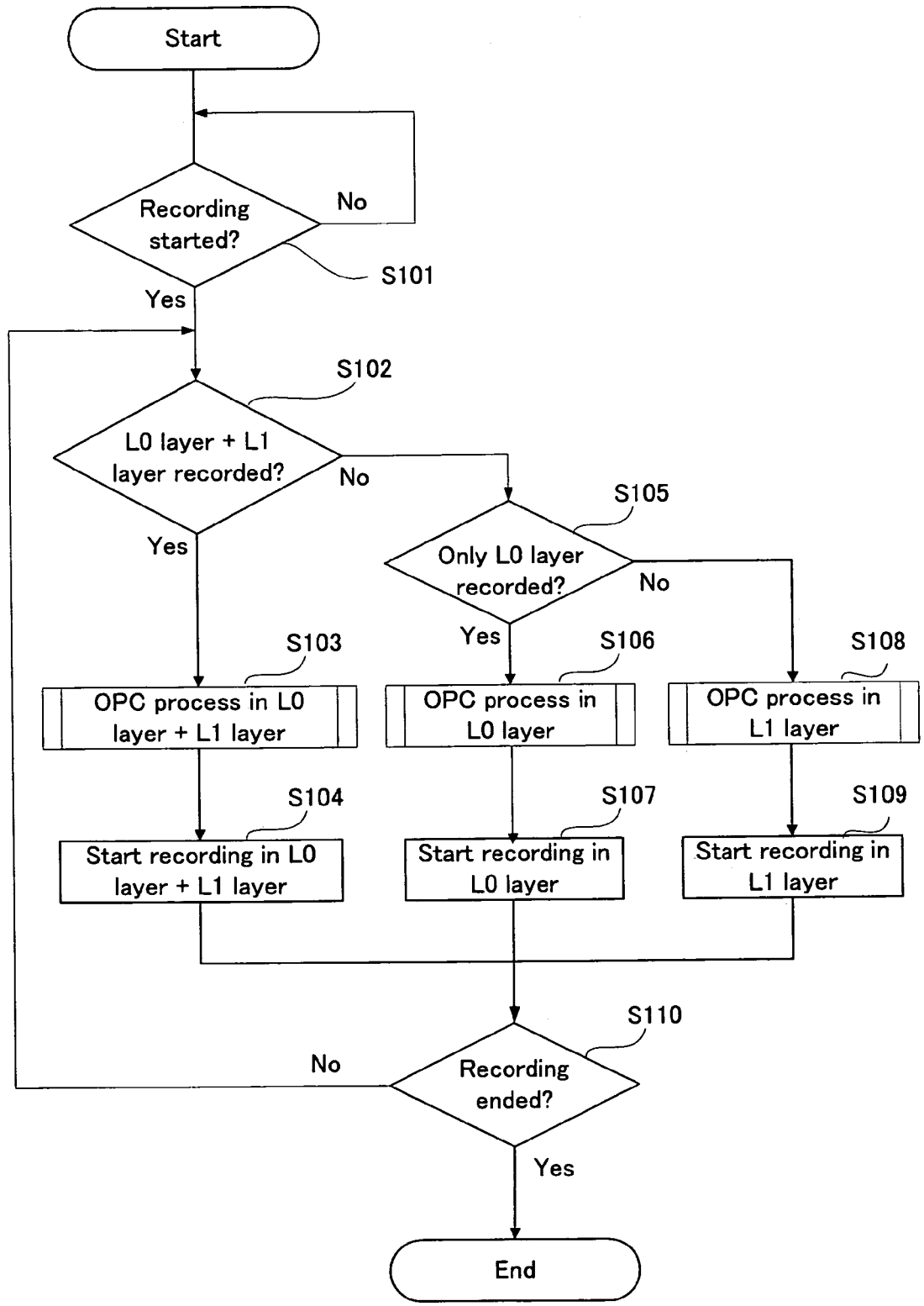

[FIG. 11]
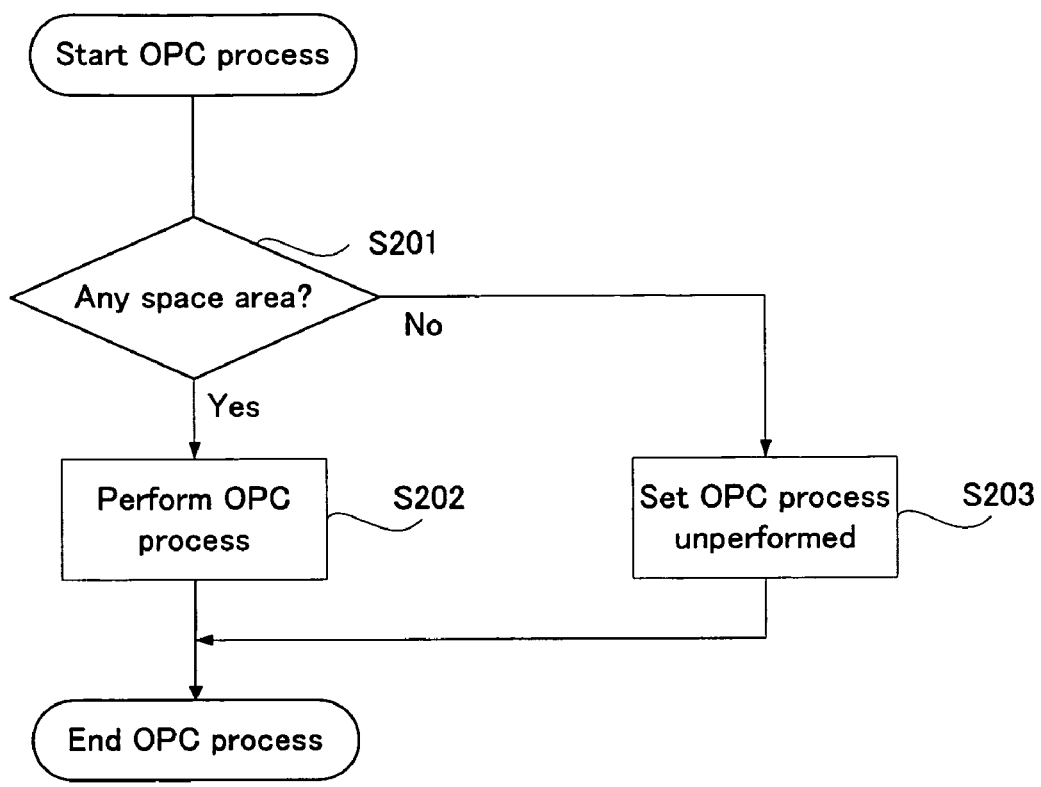

[FIG. 12]
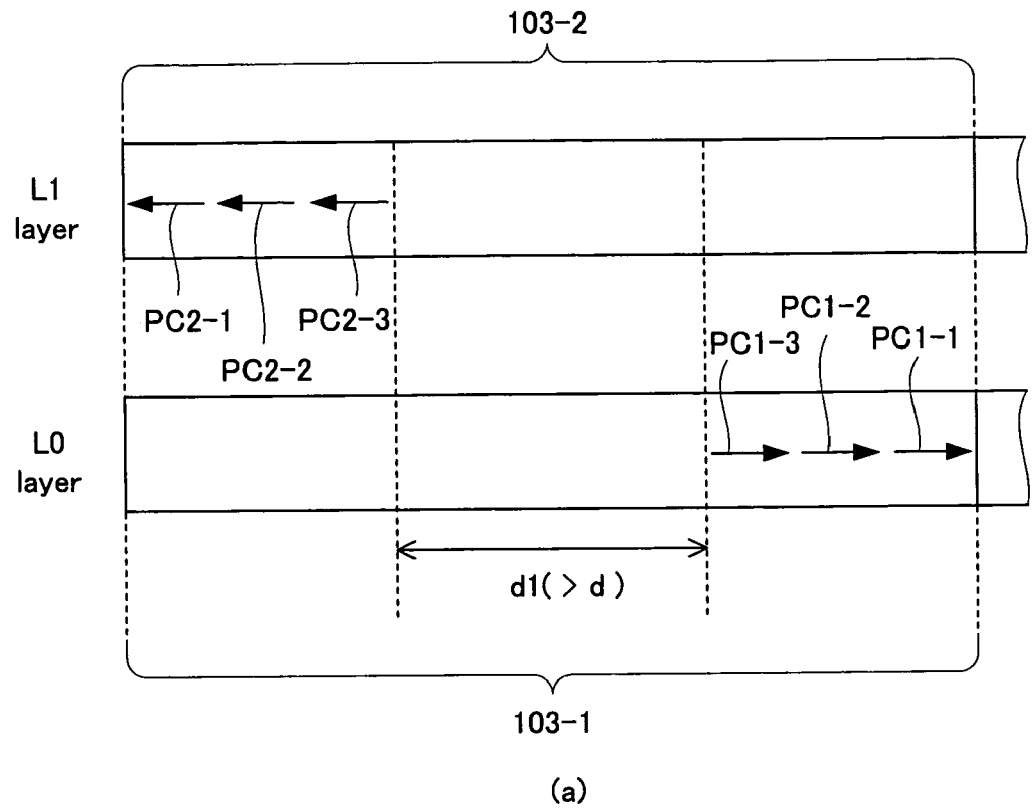
(a)
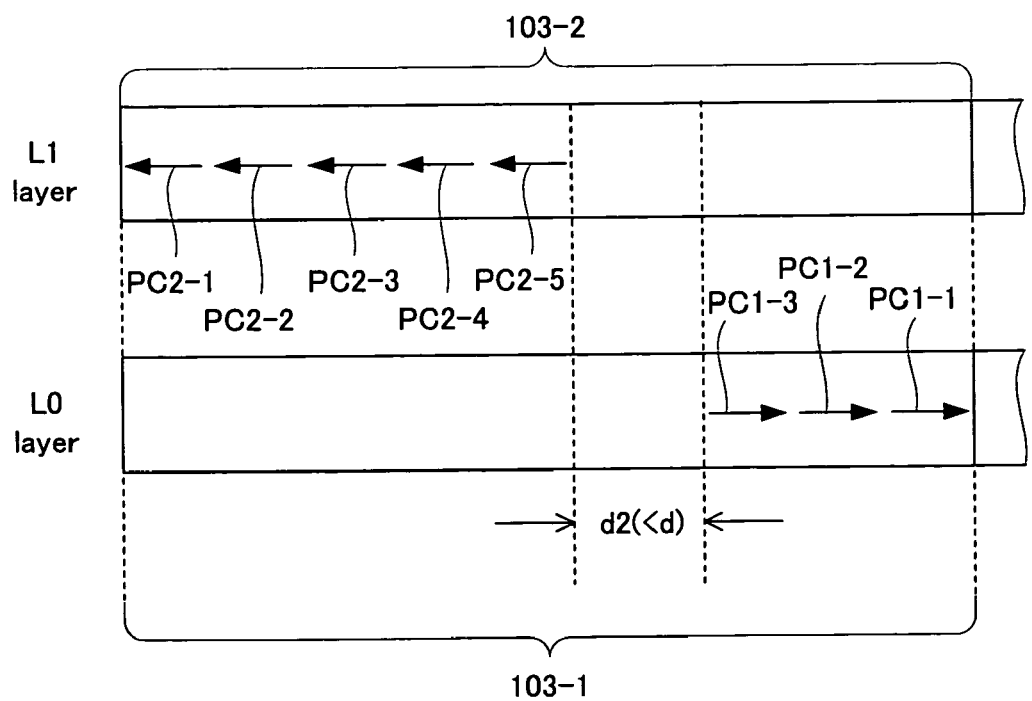
(b)

INFORMATION RECORDING MEDIUM, INFORMATION RECORDING DEVICE AND METHOD, AND COMPUTER PROGRAM

TECHNICAL FIELD

The present invention relates to an information recording medium, such as a DVD, an information recording apparatus, such as a DVD recorder, an information recording method, and a computer program which makes a computer function as the information recording apparatus.

BACKGROUND ART

For example, in the information recording medium, such as a CD and a DVD, as described in patent documents 1 and 2 or the like, there are developed a multilayer type or dual layer type optical disc and so on, in which a plurality of recording layers are stacked or laminated on the same substrate. Then, in the information recording apparatus, such as a CD recorder, for recording information onto such a dual layer type optical disc, the information is recorded into a recording layer located on the front or the closest side as viewed from the emission or irradiation side of laser light (referred to as an "L0 layer" in this application, as occasion demands), in a rewritable method or irreversible change recording method by using heat or the like, by focusing the laser light for recording on the L0 layer. Moreover, the information is recorded into a recording layer located on the rear or the farthest side of the L0 layer as viewed from the irradiation side of the laser light (referred to as an "L1 layer" in this application), in a rewritable method or irreversible change recording method by using heat or the like, by focusing the laser light on the L1 layer through the L0 layer.

Moreover, in this type of optical disc or the like, the optimum power of a recording power is set by an OPC (Optimum Power Calibration) process, depending on the type of the optical disc, the type of the information recording/reproducing apparatus, the recording rate and so on. That is, the calibration for the recording power is performed. By this, it is possible to realize an appropriate recording operation in response to variation in characteristics of the information recording surface of the optical disc. For example, if the optical disc is loaded and a writing command is inputted, data for test writing is recorded into an OPC area with sequentially changing optical intensity, so that a so-called "test writing process" is performed. In particular, according to the patent document 1, the OPC area is provided for each of the two recording layers, and a technology of performing the OPC process for each of the two layers is disclosed.

Patent document 1: Japanese Patent Application Laying Open NO. 2000-311346

Patent document 2: Japanese Patent Application Laying Open NO. 2001-23237

DISCLOSURE OF INVENTION

Subject to be Solved by the Invention

In such a dual layer type information recording medium, it is possible to provide each of the L0 layer and the L1 layer with a "PCA (Power Calibration Area)", which is an exclusive area for performing the OPC process. However, providing each of the L0 layer and the L1 layer with the PCA causes the following problems. Namely, there is a possibility that it causes variation in the state of recording into the PCA of the rear-side recording layer, in accordance with the recording state of the front side recording layer. Alternatively, there is a possibility that it causes variation in the state of recording into the PCA of the front side recording layer, in accordance with the recording state of the rear side recording layer. In this case, the result of the OPC, which is originally performed for setting the optimum power, varies depending on a time point of performing the OPC, and as a result, there is such a problem that the optimum power cannot be appropriately obtained.

In order to solve the above-mentioned conventional problems, it is therefore an object of the present invention to provide a multilayer type information recording medium on which test writing can be preferably performed in each recording layer, and an information recording apparatus and an information recording method capable of efficiently recording the information onto such an information recording medium.

Means for Solving the Subject (Information Recording Medium)

The above object of the present invention can be achieved by an information recording medium provided with: a first recording layer having a first calibration area in which test information for calibrating a power of laser light in recording record information can be recorded; and a second recording layer having a second calibration area in which the test information can be recorded and in which at least one portion of a recording area faces the first calibration area, wherein the first calibration area and the second calibration area comprise a space area having a predetermined size in positions facing each other, the test information is recorded in a recording area located on one side, centered on the space area, in the first calibration area, and the test information is recorded in a recording area located on other side which is opposite to the one side, centered on the space area, in the second calibration area.

According to the information recording medium of the present invention, it is possible to record the record information into each of the first recording layer and the second recording layer. Moreover, the first recording layer is provided with the first calibration area in which the test information for test recording, used in calibrating the power of the laser light, can be recorded. In the same manner, the second recording layer is provided with the second calibration area in which the test information can be recorded. Incidentally, with regard to the expression of "the test information can be recorded", the test information does not need to be recordable throughout all the first calibration area and the second calibration area, and it means that it is only necessary that the test information can be recorded at least partially. Moreover, the first calibration area and the second calibration area have such a positional relationship that all of the calibration areas or one portion of the calibration areas_face each other (i.e. a positional relationship that they exist in the same or substantially the same positions).

Particularly in the present invention, each of the first calibration area and the second calibration area has the space area. In particular, the space area of the first calibration area and the space area of the second calibration area face each other. Then, in the first calibration area, the test information is recorded in the recording area located on one side (e.g. on an outer circumferential side, etc.), centered on the space area. On the other hand, in the second calibration area, the test information is recorded in the recording area located on the other side (e.g. on an inner circumferential side, etc.), centered on the space area. Thus, the test information is not recorded in one portion of the recording area of the second calibration area which faces one portion of the recording area of the first calibration area in which the test information is recorded. In the same manner, the test information is not recorded in one portion of the recording area of the first calibration area which faces one portion of the recording area of the second calibration area in which the test information is recorded. By this, for example, when the test information is recorded into the first calibration area, the recording area of the second recording layer located on the rear side is fixed as an unrecorded state (or the recording area of the second recording layer located on the rear side does not vary). Moreover, for example, in recording the test information into the second calibration area, the recording area of the first recording layer located on the front side is also fixed as an unrecorded state (or the recording area of the first recording layer located on the front side does not vary). Therefore, there is no variation in the state of the recording layers on the front side and the rear side, so that it is possible to record the test information in a preferable condition into the second calibration area, regardless of the recording state of the first recording layer, and it is possible to record the test information in a preferable condition into the first calibration area, regardless of the recording state of the second recording layer.

Then, since the both calibration areas have the space area, there is not any such a positional relationship that the recording area in which the test information is recorded in the first calibration area is adjacent to the recording area in which the test information is recorded in the second calibration area. Therefore, even in view of the influence of an eccentricity described later, for example, it is possible to record the test information in a preferable condition, into each of the first calibration area and the second calibration area.

Consequently, according to the information recording medium of the present invention, it is possible to preferably perform the test writing in each of the first recording layer and the second recording layer.

In one aspect of the information recording medium of the present invention, the information recording medium has a disc-shape, and the predetermine size is a sum of an eccentricity in each of the first recording layer and the second recording layer and a radius of a laser spot in the first recording layer in the case in which the laser light is focused on the second recording layer.

According to this aspect, even if there is an eccentricity on the information recording medium, it is possible to preferably record the test information. Moreover, in view of divergence of the laser light or the like, it is possible to preferably record the test information.

In another aspect of the information recording medium of the present invention, position information which indicates a position of the space area is recorded in at least one of the first recording layer and the second recording layer.

According to this aspect, an information recording apparatus described later can recognize at least one position of the space area, relatively easily, by referring to the position information. Therefore, it is possible to preferably record the test information.

In another aspect of the information recording medium of the present invention, the information recording medium has a disc-shape, and the one side is an outer circumferential side of the information recording medium, and the other side is an inner circumferential side of the information recording medium.

According to this aspect, it is possible to preferably record the test information onto the disc-shaped (or discoid) information recording medium, such as an optical disc.

In another aspect of the information recording medium of the present invention, in the first calibration area, an area portion of a predetermined size is used toward one direction when the test information is recorded, and in the second calibration area, an area portion of a predetermined size is used toward other direction which is opposite to the one direction when the test information is recorded.

According to this aspect, in the first calibration area and the second calibration area, the test information is recorded toward opposite directions respectively. Namely, a recording area in the first calibration area into which the test information is to be recorded next and a recording area in the second calibration area into which the test information is to be recorded next gradually approach from distant positions or gradually move away from positions which sandwiches an excess area therebetween. In other words, the both areas are not arranged in parallel. By this, it is possible to preferably record the test information in each recording layer, without the state of one recording layer influencing the recording of the test information into the other recording layer.

In this aspect, the test information may be recorded toward the other direction in the first calibration area, and the test information may be recorded toward the one direction in the second calibration area.

(Information Recording Apparatus)

The above object of the present invention can be also achieved by an information recording apparatus for recording record information onto an information recording medium provided with: (i) a first recording layer having a first calibration area in which test information for calibrating a power of laser light can be recorded; and (ii) a second recording layer having a second calibration area in which the test information can be recorded and in which at least one portion of a recording area faces the first calibration area, the information recording apparatus provided with: a first calibrating device for calibrating the power for recording the record information into the first recording layer, by recording the test information into a recording area adjacent to either a starting point or an end point of the first calibration area, out of the first calibration area; a second calibrating device for calibrating the power for recording the record information into the second recording layer, by recording the test information into a recording area other than both a recording area facing the recording area adjacent to either the starting point or the end point of the first calibration area and a space area having a predetermined size, out of the second calibration area; and a recording device for recording the record information by irradiating the laser light having the power which is calibrated by at least one of the first calibrating device and the second calibrating device.

According to the information recording apparatus of the present invention, it is possible to calibrate the power (i.e. set an optimum power) for recording the record information into the first recording layer, by recording the test information into the first calibration area by the operation of the first calibrating device. In the same manner, it is possible to calibrate the power (i.e. set an optimum power) for recording the record information into the second recording layer, by recording the test information into the second calibration area by the operation of the second calibrating device.

Particularly in the present invention, the test information is recorded so as to properly ensure the space area. Specifically, the first calibrating device records the test information into at least one portion of the recording area of the first calibration area. The at least one portion of the recording area is adjacent to either the starting point or the end point of the first calibration area, so that it is unevenly distributed in either one side of the first calibration area. On the other hand, the second calibrating device records the test information into the recording area other than both the predetermined space area and the recording area facing at least one portion of the recording area. Therefore, in at least one portion of the recording area of the second calibration area facing the recording area in which the first calibrating device records the test information, the test information is not recorded by the second calibrating device. In the same manner, in at least one portion of the recording area of the first calibration area facing the recording area in which the second calibrating device records the test information, the test information is not recorded by the first calibrating device. Namely, it is possible to record the test information in a preferable condition into the second calibration area, regardless of the recording state of the first recording layer, and it is possible to record the test information in a preferable condition into the first calibration area, regardless of the recording state of the second recording layer. In addition, the test information is recorded with the space area ensured, so that it is possible to receive the same benefits owned by the above-mentioned information recording medium of the present invention.

Consequently, according to the information recording medium of the present invention, it is possible to preferably perform the test writing, in each of the first recording layer and the second recording layer.

Alternatively, the second calibrating device may calibrate the power for recording the record information into the second recording layer, by recording the test information into a recording area adjacent to either a starting point or an end point of the second calibration area, out of the second calibration area. The first calibrating device may calibrate the power for recording the record information into the first recording layer, by recording the test information into a recording area other than both a recording area facing the at least one portion of the recording area and a space area having a predetermined size, out of the first calibration area.

Incidentally, in response to the various aspects of the information recording medium of the present invention described above, the information recording apparatus of the present invention can adopt various aspects.

In one aspect of the information recording apparatus of the present invention, it is further provided with: a judging device for judging whether or not the test information can be recorded while remaining the space area in positions facing each other in both the first calibration area and the second calibration area; and a stopping device for stopping the calibration of the power performed by each of the first calibrating device and the second calibrating device if it is judged that the test information cannot be recorded while remaining the space area.

According to this aspect, it is possible to preferably record the test information into each of the first calibration area and the second calibration area, with the space area ensured, by the operations of the judging device and the stopping device.

In another aspect of the information recording apparatus of the present invention, the first calibrating device records the test information in order from one end portion of the starting point and the end point of the first calibration area, and the second calibrating device records the test information in order from other end portion of the second calibration area which is opposite to the one end portion.

According to this aspect, in the first calibration area and the second calibration area, the test information is recorded toward opposite directions respectively. By this, it is possible to preferably record the test information in each recording layer, since the state of one recording layer does not influence the recording of the test information into the other recording layer.

In another aspect of the information recording apparatus of the present invention, the first calibrating device records the test information such that an area portion of a predetermined size is used toward one direction in the first calibration area, and the second calibrating device records the test information such that an area portion of a predetermined size is used toward other direction which is opposite to the one direction in the second calibration area.

According to this aspect, in the first calibration area and the second calibration area, the test information is recorded toward opposite directions respectively. Namely, a recording area in the first calibration area into which the test information is to be recorded next and a recording area into in the second calibration area which the test information is to be recorded next gradually approach from distant positions or gradually move away from positions which sandwiches an excess area therebetween. In other words, the both areas are not arranged in parallel. By this, it is possible to preferably record the test information in each recording layer, since the state of one recording layer does not influence the recording of the test information into the other recording layer.

In this aspect, the first calibrating device may record the test information toward the other direction in the first calibration area, and may record the test information toward the one direction in the second calibration area.

In another aspect of the information recording apparatus of the present invention, the information recording medium has a disc-shape, and the predetermine size is a sum of an eccentricity in each of the first recording layer and the second recording layer and a radius of a laser spot in the first recording layer in the case in which the laser light is focused on the second recording layer.

According to this aspect, even if there is an eccentricity on the information recording medium, it is possible to preferably record the test information. Moreover, in view of divergence of the laser light or the like, it is possible to preferably record the test information.

In another aspect of the information recording apparatus of the present invention, the first calibrating device prepares first use condition information which indicates a recording condition of the test information in the first calibration area, and the second calibrating device prepares second use condition information which indicates a recording condition of the test information in the second calibration area.

According to this aspect, it is possible to preferably record the test information, with the space area ensured, by referring to the first or second use condition information in the middle of the recording operation.

(Information Recording Method)

The above object of the present invention can be also achieved by an information recording method of recording record information onto an information recording medium provided with: (i) a first recording layer having a first calibration area in which test information to calibrate a power of laser light can be recorded; and (ii) a second recording layer having a second calibration area in which the test information can be recorded and in which at least one portion of a recording area faces the first calibration area, the information recording method provided with: a first calibrating process of calibrating the power for recording the record information into the first recording layer, by recording the test information into a recording area adjacent to either a starting point or an end point of the first calibration area, out of the first calibration area; a second calibrating process of calibrating the power for recording the record information into the second recording layer, by recording the test information into a recording area other than both a recording area facing the recording area adjacent to either the starting point or the end point of the first calibration area and a space area having a predetermined size, out of the second calibration area; and a recording process of recording the record information by irradiating the laser light having the power which is calibrated in at least one of the first calibrating process and the second calibrating process.

According to the information recording method of the present invention, it is possible to receive the same various benefits as those of the above-mentioned information recording apparatus of the present invention.

Incidentally, in response to the various aspects of the information recording apparatus of the present invention described above, the information recording method of the present invention can adopt various aspects.

(Computer Program)

The above object of the present invention can be also achieved by a computer program to make a computer function as at least one portion of the above mentioned information recording apparatus (including its various aspects). Specifically, the computer program of the present invention makes the computer as at least one portion of the first calibrating device, the second calibrating device and the recording device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned information recording apparatus in the present invention, the computer program of the present invention can also adopt various aspects.

The above object of the present invention can be also achieved by a computer program product in a computer-readable medium for tangibly embodying a program of instructions executable by a computer provided in the above-mentioned information recording apparatus (including its various aspects), to make the computer function as at least one portion of the first calibrating device, the second calibrating device, and the recording device.

According to the computer program product of the present invention, the above-mentioned information recording apparatus of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the information recording apparatus of the present invention These effects and other advantages of the present invention become more apparent from the following embodiments.

As explained above, according to the information recording medium of the present invention, the first calibration area and the second calibration area have the space area in positions facing each other. The test information is recorded in the recording area located on one side, centered on the space area, in the first calibration area, and the test information is recorded in a recording area located on other side, centered on the space area, in the second calibration area. Therefore, it is possible to preferably record the test information.

As explained above, according to the information recording apparatus of the present invention, it is provided with: the first calibrating device; the second calibrating device; and the recording device. Therefore, it is possible to preferably record the test information.

BRIEF DESCRIPTION OF DRAWINGS

FIG. 1 are a substantial plan view showing the basic structure of an optical disc having a plurality of recording areas in an embodiment of the information recording medium of the present invention, a schematic cross sectional view showing the optical disc, and a schematic conceptual view showing a recording area structure in the radial direction of the optical disc corresponding to the cross sectional view.

FIG. 2 is a partially enlarged perspective view showing a recording surface of the optical disc in the embodiment.

FIG. 3 is a data structural view conceptually showing the data structure of the optical disc in the embodiment and an area used in an OPC process.

FIG. 4 is a data structural view conceptually showing an aspect of use of a power calibration area on the optical disc in the embodiment.

FIG. 5 are a plan view and a cross sectional view showing the concept of an eccentricity and a beam spot radius.

FIG. 6 is a data structural view conceptually showing an aspect of use of a recording management area on the optical disc in the embodiment.

FIG. 7 is a data structural view conceptually showing the data structure of an optical disc in a first modified example and an area used in an OPC process.

FIG. 8 is a data structural view conceptually showing the data structure of an optical disc in a second modified example and an area used in an OPC process.

FIG. 9 is a block diagram showing an information recording/reproducing apparatus in the embodiment and a host computer.

FIG. 10 is a flowchart showing a flow of entire recording operation of the information recording/reproducing apparatus in the embodiment.

FIG. 11 is a flowchart showing a flow of OPC operation out of a second recording operation of the information recording/reproducing apparatus in the embodiment.

FIG. 12 are explanatory diagrams conceptually showing a use condition of the power calibration area during the second recording operation.

DESCRIPTION OF REFERENCE CODES

100 Optical disc
103-1, 103-2 Power calibration area
103U-1, 103U-2 Unrecordable area
300 Information recording/reproducing apparatus
352 Optical pickup
353 Signal recording/reproducing device
354 CPU

BEST MODE FOR CARRYING OUT THE INVENTION

Hereinafter, the best mode for carrying out the present invention will be discussed in order for each embodiment, with reference to the drawings.

Hereinafter, the embodiments of the present invention will be discussed, with reference to the drawings.

(Information Recording Medium)

At first, with reference to FIG. 1 to FIG. 9, the embodiment of the information recording medium of the present invention will be explained.

(1) Basic Structure

At first, with reference to FIG. 1 and FIG. 2, the basic structure of an optical disc in the embodiment of the information recording medium of the present invention will be discussed. FIG. 1(a) is a substantial plan view showing the basic structure of an optical disc having a plurality of recording areas in an embodiment of the information recording medium of the present invention, and FIG. 1(b) is a schematic cross sectional view showing the optical disc, and a schematic conceptual view showing a recording area structure in the radial direction of the optical disc corresponding to the cross sectional view. FIG. 2 is a partially enlarged perspective view showing a recording surface of the optical disc in the embodiment.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 102; a data recording area 105; and a lead-out area 108 or a middle area 109, with a center hole 101 as the center. Then, a track or tracks, such as a groove track and a land track, are alternately placed, spirally or concentrically, with the center hole 101 as the center. On the track, data is divided and recorded by a unit of ECC block. The ECC block is an error-correctable data management unit.

Incidentally, the present invention is not particularly limited to the optical disc having these three areas. For example, even if the lead-in area 102, the lead-out area 108 or the middle area 109 does not exist, a data structure explained below can be constructed. Moreover, as described later, the lead-in area 102, the lead-out area 108 or the middle area 109 may be further segmentized.

In particular, as shown in FIG. 1(b), the optical disc 100 in the embodiment has such a structure that an L0 layer and an L1 layer are laminated, which constitute one example of the first recording layer and second recording layer in the present invention described later, respectively. Upon recording/reproduction of such a dual layer type optical disc 100, the recording/reproduction is performed in the L0 layer or the L1 layer, depending on which recording layer has the focus position of laser light LB, irradiated from the lower side to the upper side in FIG. 1(b).

As shown in FIG. 2, the optical disc 100 in the embodiment is constructed as a two-layer type optical disc in which a plurality of data recording areas 105 or the like are formed in a laminated structure, for example. FIG. 2 is a partially enlarged perspective view showing the recording surface of the optical disc in the first embodiment.

In FIG. 2, in the embodiment, in the optical disc 100, a first recording layer 117 (i.e. the L0 layer) of an irreversible change recording type by heat or the like which constitutes an information recording surface is laminated on a disc-shaped transparent substrate 110 (on the lower side of, in FIG. 2), and a semitransparent reflective film 118 is laminated thereon (on the lower side in FIG. 2). Moreover, a second recording layer 127 (i.e. the L1 layer) is laminated on the first recording layer 117. Specifically, an adhesive layer 115 is formed on the semitransparent reflective film 118, and the second recording layer 127 is laminated on the adhesive layer 115. A reflective layer 128 is laminated on the second recording layer 127, and lastly, a substrate layer 125 is laminated. On the information recording surface, which is constructed from the surfaces of the first recording layer 117 and the second recording layer 127, a groove track GT and a land track LT are alternately formed. Incidentally, upon the recording and the reproduction of the optical disc 100, as shown in FIG. 2, for example, the groove track GT is irradiated with the laser light LB through the transparent substrate 110. For example, upon the recording, by irradiating the laser light LB with a recording laser power, the irreversible change recording by heat is performed for the first recording layer 117 and the second recording layer 127, in accordance with the data to be recorded. On the other hand, upon the reproduction, by irradiating the laser light LB with a reproduction laser power weaker than the recording laser power, the data recorded in the first recording layer 117 and the second recording layer 127 is read.

Then, the groove track GT is wobbled with a certain amplitude and at a certain spatial frequency. In other words, the groove track GT is wobbled, and the cycle of the wobble 119 is set to a predetermined value. On the land track LT, there is formed an address pit which is referred to as a land pre-pit LPP and which indicates pre-format address information. By virtue of the two addressing (i.e. the wobble 119 and the land pre-pit LPP), it is possible to obtain information necessary for disc rotation control during the recording, generation of a recording clock or data recording, such as a recording address. Incidentally, it is also possible to record the pre-format address in advance, by modulating the wobble 119 of the groove track GT in a predetermined modulation method, such as frequency modulation or phase modulation.

(2) Data Structure

Next, with reference to FIG. 3 and FIG. 4, a detailed explanation will be given to a more detailed data structure (particularly, a data structure related to an OPC process) of the optical disc 100 in the embodiment. FIG. 3 is a data structural view conceptually showing the data structure of the optical disc 100 in the embodiment and an area used in the OPC process. FIG. 4 is a data structural view conceptually showing an aspect of use of a power calibration area on the optical disc 100 in the embodiment.

As shown in FIG. 3, the optical disc 100 has two recording layers, i.e., an L0 layer (i.e. a recording layer corresponding to the first recording layer 117 in FIG. 1 and FIG. 2) and an L1 layer (i.e. a recording layer corresponding to the second recording layer 127 in FIG. 1 and FIG. 2).

The L0 layer is provided with: a lead-in area 102; a data recording area 105-1; and a middle area 109-1, from the inner circumferential side to the outer circumferential side. The lead-in area 102 is provided with: a power calibration area (PCA) 103-1 which constitutes one example of the "first calibration area" of the present invention; and a recording management area (RMA) 104-1.

On the other hand, the L1 layer is provided with: a middle area 109-2; a data recording area 105-2; and a lead-out area 108, from the outer circumferential side to the inner circumferential side. The lead-out area 108 is provided with: a power calibration area 103-2 which constitutes one example of the "second calibration area" of the present invention; and a recording management area 104-2.

Specifically, the power calibration area 103-1 (103-2) is an area used for a process of detection of an optimum recording laser power (i.e. calibration of a recording laser power), i.e., a so-called OPC process. In particular, the power calibration area 103-1 is used for the detection of the optimum recording laser power of the L0 layer, and the power calibration area 103-2 is used for the detection of the optimum recording laser power of the L1 layer. More specifically, after the test writing of an OPC pattern, which constitutes one example of the "test information", is completed, the test-written OPC pattern is reproduced, and the reproduced OPC pattern is subsequently sampled, to thereby detect the optimum recording laser power. Moreover, the value of the optimum recording laser power obtained by the OPC may be stored into a storage apparatus, such as a memory described later, mounted on the side of an information recording/reproducing apparatus, or recorded into a management information recording area or the like of the information recording medium.

Then, the laser light for the OPC process is irradiated onto the L0 layer and the L1 layer, from the side of a not-illustrated substrate, i.e., from the lower side to the upper side in FIG. 3, by an optical pickup of the information recording/reproducing apparatus described later, and the focal distance thereof or the like is controlled. At the same time, the moving distance and direction in the radial direction of the optical disc 100 are controlled.

Particularly, in the dual layer type optical disc 100 in the embodiment, continuous recording in the "opposite method" can be performed in which the track paths are directed in the opposite direction in the two recording layers, upon the recording or reproduction process of the data. More specifically, under the "opposite method", the optical pickup of the information recording/reproducing apparatus described later is displaced in the L0 layer in the direction of a first track path TP1 shown with a right-pointing arrow in a thick line in FIG. 3, i.e. from the inner circumferential side to the outer circumferential side of the disc-shaped substrate. Then, layer jump, i.e. moving a focusing point from the L0 layer to the L1 layer, is performed. Then, the optical pickup is displaced in the L1 layer in the direction of a second track path TP2 shown with a left-pointing arrow in a thick line in FIG. 3, i.e. from the outer circumferential side to the inner circumferential side.

Moreover, particularly in the embodiment, the OPC process is collectively performed in tandem, in the recording operation in the L0 layer and the L1 layer.

Specifically, each time of the OPC process in the power calibration area 103-1 of the L0 layer is performed in order in the opposite direction of the first track path TP1.

More specifically, the first OPC process is performed from the most outer circumferential side of the power calibration area 103-1 by using an area PC1-1, and the second OPC process is performed by using an area PC1-2, and the third OPC process is performed by using an area PC1-3, sequentially. As described above, in the L0 layer, the power calibration area 103-1 is consumed, i.e. damaged, toward the inner circumferential side by the OPC process. Incidentally, in each time of the OPC process in the L0 layer, the test writing of the OPC pattern and the reproduction of the test-written OPC pattern are performed in the direction of the first track path TP1.

On the other hand, each time of the OPC process in the power calibration area 103-2 of the L1 layer is performed in order in the opposite direction of the second track path TP2.

More specifically, the first OPC process is performed from the most inner circumferential side of the power calibration area 101P-2 by using an area PC2-1, and the second OPC process is performed by using an area PC2-2, and the third OPC process is performed by using an area PC2-3, sequentially. As described above, in the L1 layer, the power calibration area 103-2 is consumed, i.e. damaged, toward the outer circumferential side by the OPC process. Incidentally, in each time of the OPC process in the L1 layer, the test writing of the OPC pattern and the reproduction of the test-written OPC pattern are performed in the direction of the second track path TP2.

Particularly in the embodiment, an unrecordable area 103U-1 having a predetermined size D, which constitutes one example of the "space area" of the present invention, is provided in the L0 layer, as shown in FIG. 4. Moreover, an unrecordable area 103U-2 having a predetermined size D, which constitutes one example of the "space area" of the present invention, is provided in the L1 layer. The unrecordable area 103U-1 and the unrecordable area 103U-2 are disposed so as to face each other (i.e. the unrecordable area 103U-1 and the unrecordable area 103U-2 are disposed in the same or substantially the same radial position).

Then, in the L0 layer, the OPC pattern is not recorded on the inner circumferential side of the unrecordable area 103U-1 (i.e. a recording area shown by a net portion). Namely, the recording area in the power calibration area 103-1 into which the OPC pattern is recorded is a partial recording area 103R-1, located from the end edge of the unrecordable area 103U-1 to the end edge of the power calibration area 103-1 (i.e. a recording area other than the net portion).

Moreover, in the L1 layer, in the same manner, the OPC pattern is not recorded on the outer circumferential side of the unrecordable area 103U-2 (i.e. a recording area shown by a net portion). Namely, the recording area in the power calibration area 103-2 into which the OPC pattern is recorded is a partial recording area 103R-2, located from the start edge of the unrecordable area 103U-2 to the start edge of the power calibration area 103-2 (i.e. a recording area other than the net portion).

By this, when the OPC pattern is recorded into the power calibration area 103-1 of the L0 layer, the facing recording area in the L1 layer on the rear side is unrecorded. Namely, it does not cause variation in the recording state of the L1 layer on the rear side in accordance with a time point of recording the OPC pattern into the power calibration area 103-1. Therefore, without consideration of the recording state of the L1 layer on the rear side, it is possible to preferably perform the OPC process in the L0 layer.

Moreover, in the L1 layer, in the same manner, when the OPC pattern is recorded into the power calibration area 103-2 in the L1 layer, the facing recording area of the L0 layer on the front side is unrecorded. Namely, it does not cause variation in the recording state of the L0 layer on the front side in accordance with a time point of recording the OPC pattern into the power calibration area 103-2. Therefore, without consideration of the recording state of the L0 layer on the front side, it is possible to preferably perform the OPC process in the L1 layer.

In addition, in the L0 layer, the OPC process is started from the outer circumferential side of the power calibration area 103-1. In the L1 layer, the OPC process is started from the inner circumferential side of the power calibration area 103-2. Thus, it is possible to prevent the occurrence of such a situation that the recording states of the recording layers influence each other, to thereby cause inaccurate test writing, in the OPC process in the L0 layer and the L1 layer.

In addition, the track paths are opposite in the L0 layer and the L1 layer, and the power calibration areas 103-1 (and 103-2) are arranged on the same side (i.e. on the inner circumferential side of the disc). Thus, the uninterrupted reproduction upon the continuous reproduction of the record information or the continuous recording of the record information can be performed, relatively easily, and further, the OPC process can be collectively performed, quickly.

Incidentally, if there is no variation in the state of each of the L0 layer and the L1 layer in the case in which the OPC process is performed, it is also possible to record the various data onto or record the various data in advance on the inner circumferential side of the unrecordable area 103-1 out of the L0 layer and the outer circumferential side of the unrecordable area 103-2 out of the L1 layer (i.e. the net area portions in FIG. 4).

Incidentally, the predetermined size D at this time is preferably determined in view of an eccentricity existing on the optical disc 100 and the beam spot radius of the laser light LB. The eccentricity and the beam spot radius will be discussed in more detail, with reference to FIG. 5. FIG. 5 are a plan view and a cross sectional view showing the concept of the eccentricity and the beam spot radius.

As shown in FIG. 5(*a*), if the center of the disc-shaped optical disc 100 does not match the central axis of rotation of the optical disc 100, there arises an eccentricity due to the shift or deviation of the central axis of rotation. If the optical disc shown in a black thick line in FIG. 2 rotates centering around the central axis of rotation shown with a black circle, the optical disc 100 exists in positions shown in dashed lines, depending on a time point of the rotation. The maximum value of the interval of the dashed lines is the eccentricity. Particularly in the embodiment, the eccentricities exist in the L0 layer and the L1 layer (wherein the eccentricities are referred to as α and β, respectively).

Moreover, as shown in FIG. 5(*b*), if the laser light LB is focused on the L1 layer, the L0 layer located on the front side is irradiated with the unfocused laser light LB. Namely, the L0 layer is irradiated with the laser light LB having a predetermined divergence. At this time, it is assumed that a beam spot with a radius of γ is formed on the recording surface of the L0 layer.

In the embodiment, in view of the eccentricities α and β and the beam spot radius γ, the above-mentioned size D is preferably determined. Specifically, the size D is preferably determined by a mathematical formula expressed by D=(α+β)/2+γ. For example, if the eccentricity α of the L0 layer is 30 μm, the eccentricity β of the L1 layer is 20 μm, and the beam spot radius γ is 25 μm, the predetermined size D is preferably (30+20)/2+25=50 μm.

Incidentally, moreover, an eccentricity caused by wobble of the recording surface, pasting or lamination errors or the like, may occur on the optical disc 100. Thus, it is preferable to also consider such an eccentricity, with regard to the eccentricity caused by the shift of the central axis of rotation, explained in FIG. 5(*a*). In short, the amount of the position shift between a recording track having a predetermined track number in the L0 layer and a recording track having a predetermined track number in the L1 layer corresponds to the eccentricity explained here.

Since the predetermined size D is determined in the above manner, when the OPC pattern is recorded into the power calibration area 103-1 of the L0 layer, the facing recording area of the L1 layer on the rear side is unrecorded regardless of the presence or absence of the eccentricity and the like on the optical disc 100. In the same manner, when the OPC pattern is recorded into the power calibration area 103-2 of the L1 layer, the facing recording area of the L0 layer on the front side is unrecorded. Therefore, as described above, it is possible to realize a preferable OPC process.

Incidentally, in a DVD as being one specific example of the optical disc 100, a maximum allowable eccentric amount is determined by the standard to be 70 μm, for example. Therefore, it is possible to determine the above-mentioned predetermined size D under the assumption that the maximum allowable eccentric amount exists on the optical disc 100.

Moreover, with regard to the beam spot radius γ, the following relationships of Equation 1 and Equation 2 apply if the numerical aperture of an optical pickup (particularly, an objective lens) for irradiating the laser light LB is NA, the refractive index of a layer between the L0 layer and the L1 layer is n, a distance between the L0 layer and the L1 layer is L, and the angle of divergence of the laser light LB is θ.

$$\gamma = L \times \tan\theta \qquad \text{[Equation 1]}$$

$$\frac{NA}{n} = \sin\theta \qquad \text{[Equation 2]}$$

By the two equations, the beam spot radius γ can be calculated from a formula expressed by the following Equation 3. Therefore, if these parameters are known upon the production of the information recording medium, the predetermined size D may be determined from a more preferable beam spot radius γ, by using the formula expressed by the Equation 3. Alternatively, the predetermined size D may be also determined under the preliminary assumption that a predetermined numerical value is the beam spot radius γ.

$$\gamma = L \times \frac{\frac{NA}{n}}{\sqrt{1 - \left(\frac{NA}{n}\right)^2}} \qquad \text{[Equation 3]}$$

Moreover, position information which is information capable of specifying the position of the unrecordable 103U-1 (103U-2) may be recorded. This position information may be recorded in a control data zone or the like in the lead-in area 102, for example. If the position information is recorded, the information recording/reproducing apparatus described later can perform an appropriate OPC process, as described above, by referring to the position information.

Incidentally, the recording and the reproduction of control information in the recording management area 104-1 of the L0 layer does not damage address information or the like, as opposed to the OPC process, and are performed in the same direction of the first track path TP1.

More specifically, as shown in FIG. 4, the first recording and reproduction of the control information are performed from the inner circumferential side of the recording management area 104-1 by using an area MD1-1, and the recording and reproduction of the control information are performed by using an area MD1-2, and the third recording and reproduction of the control information are performed by using an area MD1-3, sequentially. As described above, in the L0 layer, the recording management area 104-1 is used toward the outer circumferential side.

On the other hand, the recording and the reproduction of control information in the recording management area 104-2 of the L1 layer does not damage the address information or the like, as opposed to the OPC process, and are performed in the same direction of the second track path TP2.

More specifically, the first recording and reproduction of the control information is performed from the outer circumferential side of the recording management area 104-2 by using an area MD2-1, and the recording and reproduction of the control information is performed by using an area MD2-2, and the third recording and reproduction of the control information is performed by using an area MD2-3, sequentially. As described above, in the L1 layer, the recording management area 104-2 is used toward the inner circumferential side.

Particularly in the embodiment, as shown in FIG. 6, after the control information is recorded into the entire recording management area 104-1 of the L0 layer, the recording of the control information into the recording management area 104-2 of the L1 layer is started. Namely, in FIG. 6, after the control information is recorded into each of the areas MD1-1 to MD1-9 of the recording management area 104-1, new control information is recorded into the area MD2-1 of the recording management area 104-2.

By this, when the control information is recorded into the recording management area 104-1, the recording management area 104-2 is unrecorded. Namely, it does not cause variation in the recording state of the L1 layer on the rear side in accordance with a time point of recording the control information into the recording management area 104-1. Therefore, without consideration of the recording state of the L1 layer on the rear side, it is possible to preferably record the control information into the recording management area 104-1.

On the other hand, when the control information is recorded into the recording management area 104-2, the recording management area 104-1 is already recorded. Namely, it does not cause variation in the recording state of the L0 layer on the front side in accordance with a time point of recording the control information into the recording management area 104-2. Therefore, without consideration of the recording state of the L0 layer on the front side, it is possible to preferably record the control information into the recording management area 104-2.

Moreover, the recording management area 104-2 is preferably smaller than the recording management area 104-1, by the above-mentioned predetermined size D, on the both edges (i.e. the edge portion on the outer circumferential side and the edge portion on the inner circumferential side). Namely, as shown in FIG. 4, it is preferable to provide the unrecordable area 104U-2 having a size corresponding to the predetermined size D, on the both edge of the recording management area 104-2. By this, regardless of the presence or absence of the eccentricity and the like on the optical disc 100, when the control information is recorded into the recording management area 104-1 of the L0 layer, the facing recording management area 104-1 of the L1 layer on the rear side is unrecorded. In the same manner, when the control information is recorded into the recording management area 104-2 of the L1 layer, the facing recording management area 104-1 of the L0 layer on the front side is already recorded. Therefore, as described above, it is possible to preferably record the control information into each recording layer.

Incidentally, even in the data recording area 105-1 (105-2) or the like, as in the aspect of the recording in the recording management area 104-1 (104-2) shown in FIG. 6, it is preferable to record various data into the data recording area 105-2 of the L1 layer after the various data is recorded into the data recording area 105-1 of the L0 layer. Moreover, the data recording area 105-2 is preferably smaller than the data recording area 105-1, by the predetermined size D, on the both edges thereof, for example.

(3) First Modified Example

Next, with reference to FIG. 7, a more detailed explanation will be given to the data structure of an optical disc in the first modified example and an area used in the OPC process. FIG. 7 is a data structural view conceptually showing the data structure of the optical disc in the first modified example and the area used in the OPC process.

The basic structure and the OPC process of the optical disc in the first modified example are substantially the same as those of the optical disc in the embodiment explained with reference to FIG. 1 to FIG. 6.

Particularly in the first modified example, as shown in FIG. 7, a plurality of power calibration areas 103-1 of the L0 layer and a plurality of power calibration areas 103-2 of the L1 layer are disposed to have a complementary positional relationship. Namely, in accordance with the power calibration areas 103-1 of the L0 layer, unrecordable areas 103U-2 are disposed in the facing positions in the L1 layer (i.e. in the same radial positions). In the same manner, in accordance with the power calibration areas 103-2 of the L1 layer, unrecordable areas 103U-1 are disposed in the facing positions in the L0 layer. Of course, the plurality of power calibration areas 103-1 and 103-2, and the plurality of unrecordable areas 103U-1 and 103U-2 have the positional relationship explained in FIG. 4.

In the first modified example, the area structure is constructed in the above manner, so that it is possible to receive the effect of the optical disc in the above-mentioned embodiment, simultaneously and certainly.

(4) Second Modified Example

Next, with reference to FIG. 8, a more detailed explanation will be given to the data structure of an optical disc in the second modified example and an area used in the OPC process. FIG. 8 is a data structural view conceptually showing the data structure of the optical disc in the second modified example and the area used in the OPC process.

The basic structure and the OPC process of the optical disc in the second modified example are substantially the same as those of the optical disc in the embodiment explained with reference to FIG. 1 to FIG. 6.

Particularly, in the second modified example of the information recording medium, in addition to the above-mentioned structure of the embodiment, an unrecordable area 102U-1 is provided in the L0 layer, as shown in FIG. 8.

Specifically, in the unrecordable area 102U-1, pre-pit address information is recorded by the land pre-pit which is embossed in the land track, or the like. Therefore, for example, in accessing the recording management area 104-1 through the power calibration area 103-1 along the first track path TP1, it is possible to confirm the address information in the unrecordable area 102U-1. In particular, even if the address information in the power calibration area 103-1 is damaged by the test writing, the address information can be confirmed in the unrecordable area 102U-1 before reaching to the recording management area 104-1. Namely, it is possible to specify the current reading position of an optical pickup or the like. Therefore, in the access operation performed along the first track path, it is possible to access the start portion of the recording management area 104-1 without difficulty.

(Information Recording/Reproducing Apparatus)

Next, with reference to FIG. 9 to FIG. 12, the information recording/reproducing apparatus, which is an embodiment of the information recording apparatus of the present invention, will be explained.

(1) Basic Structure

At first, with reference to FIG. 9, the structures of an information recording/reproducing apparatus 300 in the embodiment and a host computer 400 will be discussed. FIG. 9 is a block diagram showing the information recording/reproducing apparatus 300 in the embodiment and the host computer 400. Incidentally, the information recording/reproducing apparatus 300 has a function of recording the record data onto the optical disc 100 and a function of reproducing the record data recorded on the optical disc 100.

The information recording/reproducing apparatus 300 is an apparatus for recording the information onto the optical disc 100 and reading the information recorded on the optical disc 100, under the control of a CPU (Central Processing Unit) 354 for a drive.

As shown in FIG. 9, the information recording/reproducing apparatus 300 is provided with: the optical disc 100; a spindle motor 351; an optical pickup 352; a signal recording/reproducing device 353; the CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is intended to perform the recording/reproduction with respect to the optical disc 100, and is provided with a semiconductor laser device and a lens. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352 so as to determine an optimum laser power in the recording and reproduction processes of the OPC pattern, together with a not-illustrated timing generator, under the control of the CPU 354, in the OPC process.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as recording equipment, i.e. firmware, is stored; a buffer for temporarily storing the record/reproduction data; a RAM area into which a parameter required for a firmware program operation or the like is stored; and the like.

The CPU (drive control device) 354 is connected to the signal recording/reproducing device 353 and the memory 355 through the bus 357, and controls the entire information recording/reproducing apparatus 300 by giving an instruction to each controlling device. Normally, software or firmware for operating the CPU 354 is stored in the memory 355.

The data input/output control device 306 controls the input/output of the data from the exterior with respect to the information recording/reproducing apparatus 300, to thereby perform storage to and export from the data buffer on the memory 355. A drive control command issued from the external host computer 400 (hereinafter referred to as a "host", as occasion demands) connected to the information recording/reproducing apparatus 300 through an interface, such as a SCSI and an ATAPI, is transmitted to the CPU 354 through the data input/output control device 306. Moreover, the record/reproduction data is also exchanged with the host computer 400 through the data input/output control device 306, in the same manner.

The operation/display control device 307 receives an operation instruction and performs display with respect to the host computer 400, and transmits an instruction by the operation button 310, such as an instruction to record or reproduce, to the CPU 359. The CPU 359 transmits a control command to the information recording/reproducing apparatus 300 through the data input/output control device 308, on the basis of instruction information from the operation/display control device 307, to thereby control the entire information recording/reproducing apparatus 300. In the same manner, the CPU 359 can transmit a command to require the information recording/reproducing apparatus 300 to transmit the operational state to the host computer 400. By this, it is possible to understand the operational state of the information recording/reproducing apparatus 300, such as during recording and during reproduction, so that the CPU 359 can output the operational state of the information recording/reproducing apparatus 300 to the display panel 311, such as a fluorescent tube and a LCD, through the operation/display control device 307.

The memory 360 is an internal storage device, and is provided with: a ROM area into which a firmware program, such as BIOS (Basic Input/Output System), is stored; a RAM area into which a parameter required for the operation of an operating system, an application program or the like is stored; and the like. Moreover, the memory 360 may be connected to a not-illustrated external storage device, such as a hard disk, through the data input/output control device 308.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the information recording/reproducing apparatus 300 is a disk drive (hereinafter referred to as a "drive", as occasion demands), and the host computer 400 is a personal computer and a work station. The host computer 400, such as the personal computer, and the disk drive are connected through the data input/output control devices 306 and 308, such as the SCSI and the ATAPI, and application, such as writing software, installed in the host computer 400 controls the disk drive.

(2) First Recording Operation

Next, with reference to FIG. 10, the first recording operation performed by the information recording/reproducing apparatus in the embodiment will be discussed. FIG. 10 is a flowchart showing a flow of the entire first recording operation of the recording/reproducing apparatus in the embodiment.

Incidentally, the first recording operation is a recording operation performed for the above-mentioned optical disc 100 in the embodiment (i.e. the optical disc provided with the unrecordable area 103U-1 (103U-2) in the power calibration area 103-1 (103-2)).

In FIG. 10, at first, if the optical disc 100 is loaded, a seek operation is performed by the optical pickup 352, under the control of the CPU 354, to obtain various management information required for the recording process with respect to the optical disc 100. On the basis of the management information, it is judged whether or not the recording operation of the data onto the optical disc 100 is started by using the data input/output control device 306, in accordance with an instruction from exterior input equipment or the like, under the control of the CPU 354 (step S101). Here, if the recording operation of the data onto the optical disc 100 is started (the step S101: Yes), then, it is further judged whether the recording layer which is a recording target is both the L0 layer and the L1 layer (step S102). Here, if the recording layer which is the recording target is both the L0 layer and the L1 layer (the step S102: Yes), the OPC process is performed for both the L0 layer and the L1 layer (step S103).

Then, the data is recorded into both the L0 layer and the L1 layer, with the optimum recording laser power calculated in the step S103 (step S104).

On the other hand, as a result of the judgment in the step S102, if the recording layer which is the recording target is not the L0 layer and the L1 layer (the step S102: No), then, it is further judged whether or not the recording layer which is the recording target is only the L0 layer (step S105). Here, if the recording layer which is the recording target is only the L0 layer (the step S105: Yes), the OPC process is performed for the L0 layer (step S106).

Then, the data is recorded into the L0 layer, with the optimum recording laser power calculated in the step S106 (step S107).

On the other hand, if the recording layer which is the recording target is not only the L0 layer (the step S105: No), the OPC process is performed for the L1 layer (step S108).

Then, the data is recorded into the L1 layer, with the optimum recording laser power calculated in the step S108 (step S109).

Then, it is judged whether or not the recording operation of the data is ended (step S110). Here, if the recording operation of the data is ended (the step S110: Yes), the series of recording operation performed by the information recording apparatus is completed.

On the other hand, if the recording operation of the data is not ended (the step S110: No), as described above, it is judged whether the recording layer which is a recording target is the L0 layer and the L1 layer (the step S102).

On the other hand, as a result of the judgment in the step S101, if the recording operation of the data onto the optical disc 100 is not started (the step S101: No), for example, a command to start the recording operation or the like is waited for.

As described above, in the first recording operation, the OPC process is performed for the above-mentioned optical disc 100 in the embodiment, to thereby record the various data. Therefore, without consideration of the recording state of the L1 layer on the rear side, it is possible to preferably perform the OPC process in the L0 layer. Moreover, without consideration of the recording state of the L0 layer on the front side, it is possible to preferably perform the OPC process in the L1 layer.

Furthermore, in the first recording operation, as in the above-mentioned explanation, the track paths are directed opposite to each other, and the power calibration areas 103-1 and 103-2 are arranged on the same side (i.e. on the inner circumferential side of the disc), so that it is possible to correctively perform the OPC process, quickly. Moreover, after the recording, the uninterrupted reproduction upon the continuous reproduction of the record information can be performed, relatively easily.

(3) Second Recording Operation

Next, with reference to FIG. 11 and FIG. 12, the second recording operation performed by the information recording/reproducing apparatus 300 in the embodiment will be discussed. FIG. 11 is a flowchart showing a flow of the OPC operation out of the second recording operation of the information recording/reproducing apparatus in the embodiment. FIG. 12 are explanatory diagrams conceptually showing the use condition of the power calibration area during the second recording operation.

Incidentally, the second recording operation is an example of the recording operation in which the same OPC process as that in the first recording operation is performed for an optical disc which is not provided with the unrecordable area 103U-1 (103U-2) in the power calibration area 103-1 (103-2) in advance. In other words, it is an example of the recording operation in which the OPC process is performed while a recording area into which the OPC pattern can be recorded in the power calibration area 103-1 (103-2) is determined, as occasion demands, on the information recording/reproducing apparatus side.

Even in the second recording operation, the various operations explained by using FIG. 9 are performed in the same manner as in the first recording operation. Particularly in the second recording operation, when the OPC process is performed for each of the L0 layer and the L1 layer, operations explained with reference to FIG. 11 are performed. Namely, in the OPC process in the steps S103, S104, and S106 to S109 in FIG. 10, the operations explained with reference to FIG. 11 are performed.

As shown in FIG. 11, at first, it is judged whether or not the OPC pattern can be recorded into the power calibration areas 103-1 and 103-2, under the control of the CPU 354 (step S201). Namely, it is judged whether or not the OPC pattern can be recorded, while remaining space areas corresponding to the above-mentioned unrecordable areas 103U-1 and 103U-2 in positions facing each other. Specifically, it is judged whether or not there is a space area having a size corresponding to the sum of the above-mentioned predetermined size D and the size of the OPC pattern recorded in one OPC process (hereinafter referred to as a "space area having a predetermined size d"), in the same radial position of each recording layer, between a recording area in which the OPC pattern is already recorded in the power calibration area 103-1 and a recording area in which the OPC pattern is already recorded in the power calibration area 103-2. If there is no space area having the predetermined size d, it is judged that the OPC pattern cannot be recorded.

This judgment operation will be more specifically explained, with reference to FIG. 12. As shown in FIG. 12(a), if there is a space area having a size d1 larger than the predetermined size d between the recording area in which the OPC pattern is already recorded in the power calibration area 103-1 and the recording area in which the OPC pattern is already recorded in the power calibration area 103-2, it is judged that the OPC pattern can be recorded. On the other hand, as shown in FIG. 12(b), if there is a space area having a size d2 smaller than the predetermined size d between the recording area in which the OPC pattern is already recorded in the power calibration area 103-1 and the recording area in which the OPC pattern is already recorded in the power calibration area 103-2, it is judged that the OPC pattern cannot be recorded.

In FIG. 11 again, as a result of the judgment, if it is judged that the OPC pattern can be recorded (the step S201: Yes), the OPC process is performed (step S202).

On the other hand, if it is judged that the OPC pattern cannot be recorded (the step S201: No), it is judged that the OPC process is no longer performed, and the OPC process is not performed (step S203). In other words, even if there is a space area in the power calibration area 103-1 (103-2) itself, it is not possible to record the OPC pattern into the L0 layer without consideration of the recording state of the L1 layer on the rear side, nor record the OPC pattern into the L1 layer without consideration of the recording state of the L0 layer on the front side, at this time point, as described above. Therefore, from the viewpoint of performing a preferable OPC process, the OPC process is no longer performed.

However, from the view point that the optimum recording laser power is obtained by merely performing the OPC process, it may be constructed such that the OPC pattern is further recorded into the power calibration area 103-1 (103-2) to thereby perform the OPC process.

As described above, in the second recording operation, the OPC process is performed while the use condition of the power calibration area 103-1 (103-2) is considered, as occasion demands, to thereby record the various data. Therefore, as in the first recording operation, without consideration of the recording state of the L1 layer on the rear side, it is possible to preferably perform the OPC process in the L0 layer. Moreover, without consideration of the recording state of the L0 layer on the front side, it is possible to preferably perform the OPC process in the L1 layer.

In addition, the information recording/reproducing apparatus 300 does not record the OPC pattern into a predetermined recording area out of the power calibration area 103-1 (103-2) as in the first recording operation, but preferably record the OPC pattern in accordance with an actually performed OPC process. For example, it is assumed that the OPC process is performed relatively less frequently in the L0 layer, and on the other hand, the OPC process is performed relatively frequently in the L1 layer. If the recording area in which the OPC pattern can be recorded is determined in advance, there is a possibility that the OPC process cannot be performed in the L1 layer. In the second recording operation, however, even in that case, it is possible to record the OPC pattern into a wider recording area and preferably perform the OPC process, in the L1 layer.

Incidentally, it may be constructed such that use condition information which indicates the use condition of the power calibration area 103-1 (103-2) is recorded. For example, it may be constructed such that use condition information is recorded which indicates a recording area in the power calibration area 103-1 (103-2) in which the OPC pattern is already recorded. Then, in the judgment operation in the step S201 in FIG. 11, by referring to the use condition information, it is possible to judge whether or not the OPC pattern can be recorded, relatively easily and quickly.

Moreover, in the above-mentioned embodiment, the optical disc 100 is explained as one example of the information recording medium, and the recorder or player related to the optical disc 100 is explained as one example of the information recording/reproducing apparatus. The present invention, however, is not limited to the optical disc and the recorder thereof, and can be applied to other various information recording media and players thereof that support high-density recording or a high transfer rate.

The present invention is not limited to the above-described example, and various changes may be made, if desired, without departing from the essence or spirit of the invention which can be read from the claims and the entire specification. An information recording apparatus, an information recording method, and a computer program for recording control, all of which involve such changes, are also intended to be within the technical scope of the present invention.

INDUSTRIAL APPLICABILITY

The information recording medium, the information recording apparatus, the information recording method, and the computer program according to the present invention can be applied to a high-density optical disc, such as a DVD, and also applied to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus for recording record information onto an information recording medium, the information recording medium comprising (i) a first recording layer having a first calibration area in which test information for calibrating a power of laser light can be recorded; and (ii) a second recording layer having a second calibration area in which the test information can be recorded and which is located on a radial position where the first calibration area is located, said information recording apparatus comprising:

a first recording device for recording the record information, along a direction from an inner circumferential side of the information recording medium to an outer circumferential side of the information recording medium, into the first recording layer;

a second recording device for recording the record information, along a direction from the outer circumferential side to the inner circumferential side, into the second recording layer;

a judging device for judging whether the first and second calibration areas have a space area having a predetermined size in positions facing each other;

a first calibrating device for calibrating the power for recording the record information into said first recording layer, by recording the test information into a recording area located on a more outer side than the space area, out of the first calibration area, so that a plurality of area portions each having a predetermined size are sequentially used along the direction from the outer side to the inner side; and a second calibrating device for calibrating the power for recording the record information into said second recording layer, by recording the test information into a recording area located on a more inner side than the space area other side which is opposite to the one side, centered on the space area, out of the second calibration area, so that a plurality of area portions each having a predetermined size are sequentially used along the direction from the inner side to the outer side, wherein, (i) the first or second calibrating device operates, if the judging device judges that the first and second calibration areas have the space area having the predetermined size, and (ii) the first or second calibrating device does not operate, if the judging device judges that the first and second calibration areas do not have the space area having the predetermined size.

2. The information recording apparatus according to claim 1, wherein, said first calibrating device prepares first use condition information which indicates a recording condition of the test information in the first calibration area, and said second calibrating device prepares second use condition information which indicates a recording condition of the test information in the second calibration area.

3. An information recording method of recording record information onto an information recording medium, the information recording medium comprising: (i) a first recording layer having a first calibration area in which test information for calibrating a power of laser light can be recorded; and (ii) a second recording layer having a second calibration area in which the test information can be recorded and which is located on a radial position where the first calibration area is located, said information recording method comprising:

a first recording process of recording the record information, along a direction from an inner circumferential side of the information recording medium to an outer circumferential side of the information recording medium, into the first recording layer;

a second recording process of recording the record information, along a direction from the outer circumferential side to the inner circumferential side, into the second recording layer;

a judging process of judging whether the first and second calibration areas have a space area having a predetermined size in positions facing each other;

a first calibrating process of calibrating the power for recording the record information into said first recording layer, by recording the test information into a recording area located on a more outer side than the space area, out of the first calibration area, so that a plurality of area portions each having a predetermined size are sequentially used along the direction from the outer side to the inner side; and a second calibrating process of calibrating the power for recording the record information into said second recording layer, by recording the test information into a recording area located on a more inner side than the space area other side which is opposite to the one side, centered on the space area, out of the second calibration area, so that a plurality of area portions each having a predetermined size are sequentially used along the direction from the inner side to the outer side, wherein (i) the first or second calibrating process operates when the judging process judges that the first and second calibration areas have the space area having the predetermined size, and (ii) the first or second calibrating process does not operate when the judging process judges that the first and second calibration areas do not have the space area having the predetermined size.

4. A combination, comprising:

an information recording medium; and an information recording apparatus for recording record information onto the information recording medium, the information recording medium comprising:

(i) a first recording layer having a first calibration area in which test information for calibrating a power of laser light can be recorded; and (ii) a second recording layer having a second calibration area in which the test information can be recorded and which is located on a radial position where the first calibration area is located, and said information recording apparatus comprising:

a first recording device for recording the record information, along a direction from an inner circumferential side of the information recording medium to an outer circumferential side of the information recording medium, into the first recording layer;

a second recording device for recording the record information, along a direction from the outer circumferential side to the inner circumferential side, into the second recording layer;

a judging device for judging whether the first and second calibration areas have a space area having a predetermined size in positions facing each other;

a first calibrating device for calibrating the power for recording the record information into said first recording layer, by recording the test information into a recording area located on a more outer side than the space area, out of the first calibration area, so that a plurality of area portions each having a predetermined size are sequentially used along the direction from the outer side to the inner side; and a second calibrating device for calibrating the power for recording the record information into said second recording layer, by recording the test information into a recording area located on a more inner side than the space area other side which is opposite to the one side, centered on the space area, out of the second calibration area, so that a plurality of area portions each having a predetermined size are sequentially used along the direction from the inner side to the outer side, wherein, (i) the first or second calibrating device operates, if the judging device judges that the first and second calibration areas have the space area having the predetermined size, and (ii) the first or second calibrating device does not operate, if the judging device judges that the first and second calibration areas do not have the space area having the predetermined size.

5. The combination of claim 4, wherein, said first calibrating device prepares first use condition information which indicates a recording condition of the test information in the first calibration area, and said second calibrating device prepares second use condition information which indicates a recording condition of the test information in the second calibration area.

* * * * *